US012691405B2

(12) United States Patent
Hogg et al.

(10) Patent No.: US 12,691,405 B2
(45) Date of Patent: Jul. 28, 2026

(54) ROTARY ADSORPTION MACHINE AND A HOUSING THEREFOR

(71) Applicant: Howden Group Limited, Renfrew (GB)

(72) Inventors: Dougal Hogg, Glasgow (GB); Joanne Moore, Falkirk (GB); James Nimmo, Cumbernauld (GB); Laura Morrison, Coatbridge (GB)

(73) Assignee: HOWDEN GROUP LIMITED, Renfrew (GB)

( * ) Notice: Subject to any disclaimer, the term of this patent is extended or adjusted under 35 U.S.C. 154(b) by 308 days.

(21) Appl. No.: 18/613,410

(22) Filed: Mar. 22, 2024

(65) Prior Publication Data

US 2024/0342643 A1    Oct. 17, 2024

Related U.S. Application Data

(60) Provisional application No. 63/495,609, filed on Apr. 12, 2023.

(51) Int. Cl.
B01D 53/04      (2006.01)
B01D 53/06      (2006.01)

(52) U.S. Cl.
CPC .................................. B01D 53/06 (2013.01)

(58) Field of Classification Search
CPC .... B01D 53/04; B01D 53/06; B01D 53/0407; B01D 2253/102; B01D 2253/108; B01D 2253/204; B01D 2257/504; B01D 2258/06

(Continued)

(56) References Cited

U.S. PATENT DOCUMENTS

| 1,590,266 | A | 6/1926 | Tiedtke |
| 2,174,666 | A | 10/1939 | Logan |

(Continued)

FOREIGN PATENT DOCUMENTS

| CN | 111644018 | B | 9/2020 | |
| EP | 0382965 | A2 * | 8/1990 | ............. B01D 46/00 |

OTHER PUBLICATIONS

US 10,201,783 B2, 02/2019, Luo (withdrawn)

(Continued)

*Primary Examiner* — Frank M Lawrence, Jr.

(74) *Attorney, Agent, or Firm* — Edell, Shapiro & Finnan, LLC

(57)      ABSTRACT

A housing for a rotary adsorption machine includes a peripheral section configured to circumferentially surround a rotor and define a plurality of zones through which the rotor can rotate, including an adsorption zone, a desorption zone, and a regeneration zone. The housing may include two or more sector plate assemblies that define the plurality of zones. The housing may include a plurality of ducts that define passageways into and out of the plurality of zones, and the peripheral section may connects each duct inlets with its duct outlet. The housing also includes structural reinforcements and thermal expansion elements. The structural reinforcements that support the rotor, balance internal pressures in the housing, and/or dampen or eliminate tilting or deflections in the housing. The thermal expansion elements that allow the two or more sector plate assemblies to create seals between the plurality of zones.

20 Claims, 19 Drawing Sheets

(58) Field of Classification Search
USPC ................................ 95/113; 96/125; 55/501
See application file for complete search history.

(56) References Cited

U.S. PATENT DOCUMENTS

| | | | |
|---|---|---|---|
| 2,294,214 A | 8/1942 | Seinfeld |
| 2,639,000 A | 5/1953 | Edwards |
| 2,751,033 A | 6/1956 | Miller |
| 3,183,649 A | 5/1965 | Teller |
| 3,197,944 A | 8/1965 | Westeren |
| 3,243,651 A | 3/1966 | Arnoldi |
| 4,062,129 A | 12/1977 | Yoshida |
| 4,351,650 A | 9/1982 | Shinoda |
| 4,534,777 A | 8/1985 | Castleman |
| 4,548,802 A | 10/1985 | Dickey |
| 4,589,892 A | 5/1986 | Leonard |
| 4,650,575 A | 3/1987 | White, Jr. |
| 4,726,903 A | 2/1988 | Dickey |
| 4,729,774 A | 3/1988 | Cohen |
| 4,741,889 A | 5/1988 | Ritter |
| 4,775,484 A | 10/1988 | Schmidt |
| 4,946,479 A | 8/1990 | Izumo |
| 5,017,202 A | 5/1991 | Ogata |
| 5,057,128 A | 10/1991 | Panzica |
| 5,133,784 A | 7/1992 | Boudet |
| 5,167,679 A | 12/1992 | Maekawa |
| 5,441,559 A | 8/1995 | Petit |
| 5,464,468 A | 11/1995 | Tanaka |
| 5,584,916 A | 12/1996 | Yamashita |
| 5,595,238 A | 1/1997 | Mark |
| 5,759,242 A | 6/1998 | Smolarek |
| 5,776,228 A | 7/1998 | Meiller |
| 5,980,612 A | 11/1999 | Kelly |
| 6,004,384 A | 12/1999 | Caudle |
| 6,280,508 B1 | 8/2001 | Garrett |
| 6,311,719 B1 | 11/2001 | Hill |
| 6,328,787 B1 | 12/2001 | Yamauchi |
| 6,361,585 B1 | 3/2002 | Anzai |
| 6,406,523 B1 | 6/2002 | Connor |
| 6,447,583 B1 | 9/2002 | Thelen |
| 6,521,026 B1 | 2/2003 | Goto |
| 6,527,837 B2 | 3/2003 | Kurosawa |
| 6,533,846 B1 | 3/2003 | Keefer |
| 6,565,635 B2 | 5/2003 | Keefer |
| 6,585,805 B1 | 7/2003 | Wheat |
| 6,746,515 B2 | 6/2004 | Wegeng |
| 6,978,635 B2 | 12/2005 | Yabu |
| 7,037,358 B2 | 5/2006 | Babicki |
| 7,101,414 B2 | 9/2006 | Dinnage |
| 7,220,390 B2 | 5/2007 | Tonkovich |
| 7,569,101 B2 | 8/2009 | Hung |
| 7,722,703 B2 | 5/2010 | Fujioka |
| 7,753,995 B2 | 7/2010 | Okano |
| 7,763,102 B2 | 7/2010 | Lomax, Jr. |
| 7,972,422 B2 | 7/2011 | Ballard |
| 8,163,066 B2 | 4/2012 | Eisenberger |
| 8,349,182 B2 | 1/2013 | Augier |
| 8,435,334 B2 | 5/2013 | Hart et al. |
| 8,470,395 B2 | 6/2013 | Khiavi |
| 8,500,855 B2 | 8/2013 | Eisenberger |
| 8,500,857 B2 | 8/2013 | Eisenberger |
| 8,500,858 B2 | 8/2013 | Eisenberger |
| 8,500,859 B2 | 8/2013 | Eisenberger |
| 8,500,860 B2 | 8/2013 | Eisenberger |
| 8,500,861 B2 | 8/2013 | Eisenberger |
| 8,597,409 B2 | 12/2013 | Vanderstraeten |
| 8,628,608 B2 | 1/2014 | Jensen |
| 8,647,418 B2 | 2/2014 | Furuyama |
| 8,685,259 B2 | 4/2014 | Augier |
| 8,696,801 B2 | 4/2014 | Eisenberger |
| 8,728,218 B2 | 5/2014 | Knapp |
| 8,747,528 B2 | 6/2014 | Hung |
| 8,753,428 B2 | 6/2014 | Lomas, Jr. |
| 8,808,426 B2 | 8/2014 | Sundaram |
| 8,858,690 B2 | 10/2014 | Halder |
| 8,876,957 B2 | 11/2014 | Fujioka |
| 8,894,747 B2 | 11/2014 | Eisenberger |
| 8,900,347 B2 | 12/2014 | Boulet |
| 8,940,072 B2 | 1/2015 | Boulet |
| 9,028,592 B2 | 5/2015 | Eisenberger |
| 9,050,553 B2 | 6/2015 | Alizadeh-Khiavi |
| 9,061,237 B2 | 6/2015 | Eisenberger |
| 9,146,035 B2 | 9/2015 | Boulet |
| 9,227,153 B2 | 1/2016 | Eisenberger |
| 9,409,770 B2 | 8/2016 | Ginzburg |
| 9,433,896 B2 | 9/2016 | Eisenberger |
| 9,533,252 B2 | 1/2017 | Boulet |
| 9,539,540 B2 | 1/2017 | Elliott |
| 9,555,365 B2 | 1/2017 | Eisenberger |
| 9,616,378 B2 | 4/2017 | Eisenberger |
| 9,630,143 B2 | 4/2017 | Eisenberger |
| 9,731,242 B2 | 8/2017 | Zhou |
| 9,776,131 B2 | 10/2017 | Eisenberger |
| 9,855,524 B2 | 1/2018 | Okano |
| 9,878,286 B2 | 1/2018 | Eisenberger |
| 9,884,282 B2 | 2/2018 | Boulet |
| 9,908,080 B2 | 3/2018 | Eisenberger |
| 9,908,083 B2 | 3/2018 | Maruyama |
| 9,925,488 B2 | 3/2018 | Eisenberger |
| 9,937,461 B2 | 4/2018 | Eisenberger |
| 9,943,803 B2 | 4/2018 | Fredenhagen |
| 9,975,087 B2 | 5/2018 | Eisenberger |
| 10,105,695 B2 | 10/2018 | Boulet |
| 10,174,943 B2 | 1/2019 | Boulet |
| 10,239,017 B2 | 3/2019 | Eisenberger |
| 10,315,159 B2 | 6/2019 | Boulet |
| 10,391,441 B2 | 8/2019 | Chang |
| 10,413,866 B2 | 9/2019 | Eisenberger |
| 10,427,091 B2 | 10/2019 | Nagavarapu |
| 10,512,880 B2 | 12/2019 | Eisenberger |
| 10,617,992 B2 | 4/2020 | Boulet |
| 10,744,448 B2 | 8/2020 | Dubois |
| 10,786,779 B2 | 9/2020 | Lammers |
| 10,799,828 B2 | 10/2020 | Postgate |
| 11,014,040 B2 | 5/2021 | Boulet |
| 11,027,233 B2 | 6/2021 | Chigira |
| 11,033,854 B2 | 6/2021 | Nagavarapu |
| 11,071,941 B2 | 7/2021 | Kukreja |
| 11,117,088 B2 | 9/2021 | Boulet |
| 11,148,094 B2 | 10/2021 | Boulet |
| 11,224,834 B2 | 1/2022 | Boulet |
| 11,266,951 B1 | 3/2022 | Stark, Jr. |
| 11,378,274 B2 | 7/2022 | Boulet |
| 2013/0305930 A1* | 11/2013 | Oh .................. F02M 35/02425 |
| | | 96/385 |
| 2015/0053087 A1 | 2/2015 | Postgate |
| 2018/0133640 A1 | 5/2018 | Boulet |
| 2018/0169567 A1 | 6/2018 | Vandervorst |
| 2019/0009262 A1 | 1/2019 | Boulet |
| 2019/0126190 A1 | 5/2019 | Boulet |
| 2019/0329174 A1 | 10/2019 | Khiavi |
| 2021/0106945 A1 | 4/2021 | Lammers |
| 2021/0146303 A1 | 5/2021 | Eisenberger |
| 2021/0354074 A1 | 11/2021 | Boulet |
| 2021/0354085 A1 | 11/2021 | Khiavi |
| 2021/0394111 A1 | 12/2021 | Boulet |
| 2022/0008863 A1 | 1/2022 | Kukreja |
| 2022/0088531 A1 | 3/2022 | Boulet |
| 2022/0212141 A1 | 7/2022 | Younes |
| 2022/0274047 A1 | 9/2022 | Lim |
| 2022/0290860 A1 | 9/2022 | Boulet |
| 2024/0390837 A1* | 11/2024 | Goftar .................. B01D 53/06 |

OTHER PUBLICATIONS

Notification of Transmittal of International Search Report and Written Opinion, including International Search Report and Written Opinion for International Patent Application No. PCT/IB2024/053470, mailed Jul. 30, 2024, 14 pages.

Stevenson Matthew et al: "NRG CO2NCEPT—Confirmation Of Novel Cost-effective Emerging Post-combustion Technology", USDOE Office of Fossil Energy (FE), Oct. 19, 2016 (Oct. 19, 2016),

(56) References Cited

OTHER PUBLICATIONS

XP093093257, DOI: 10.2172/1329324, Retrieved from the Internet: URL: https://www.osti.gov/biblio/1329324.

Herraiz, Laura et al., "Rotary Adsorption: Selective Recycling of CO2 in Combined Cycle Gas Turbine Power Plants," Frontiers in Energy Research, vol. 8, Dec. 11, 2020, 21 pages, doi: 10.3389/fenrg.2020.482708.

AGH: "Global Thermostat Core Solution," Global Thermostat, Feb. 27, 2023, 5 pages.

Kaufman, Leslie et al., "A Carbon-Sucking Startup Has Been Paralyzed by Its CEO," Bloomber, Green | Energy and Science, Apr. 9, 2021, 11 pages, https://www.bloomberg.com/news/features/2021-04-09/inside-america-s-race-to-scale-carbon-capture-technology.

* cited by examiner

ROTARY ADSORPTION MACHINE AND A HOUSING THEREFOR

This application claims priority to and the benefit of U.S. Provisional Patent Application No. 63/495,609, filed Apr. 12, 2023, which is hereby incorporated in its entirety for all purposes.

FIELD OF INVENTION

The present invention relates to the field of rotary exchangers and, in particular, to industrial rotary adsorption machines and housings for such machines.

BACKGROUND

Rotary adsorption machines, which are also known as thermal swing adsorption machines, pressure swing adsorption machines, regenerative rotary separators, and the like, are often deployed to recover specific gasses, elements, and/or particulates, such as carbon dioxide. More specifically, rotary adsorption machines (RAMs) are often deployed for point source carbon capture and/or for direct air carbon capture. In any case, RAMs typically include an adsorbent material, such as activated carbon, metal-organic frameworks (MOFs) or zeolite (e.g., hydrated aluminosilicates of alkaline and alkaline-earth metals), in a rotatable rotor. Then, when a process gas, such as a carbon dioxide ($CO_2$)-laden gas, enters the rotor, the target gasses, elements, and/or particulates (e.g., $CO_2$) is/are adsorbed onto the adsorbent material. The rotor the rotates the adsorbed substance into a desorption zone to release the target substance from the adsorbent so that the target substance can be captured, processed, or used. The desorption is caused by a change in pressure and/or a change in temperature (e.g., by passing steam through the rotor, or through electric heating elements).

Existing RAMs are mostly small scale machines. However, small scale RAMs may be insufficient to meet ambitious $CO_2$ emission reduction targets being targeted to combat global climate changes. Thus, improved RAMs, especially large scale RAMs suitable for industrial applications, are particularly desirable. Additionally or alternatively, improvements to RAM components or portions that enable large scale and/or industrial applications are highly desired.

SUMMARY

The present invention relates to a rotary adsorption machine and/or a housing for a rotary adsorption machine. For example, a housing for a rotary adsorption machine may include a peripheral section, two or more sector plate assemblies, and a plurality of ducts. The peripheral section is configured to circumferentially surround a rotor and define a plurality of zones through which the rotor can rotate, including an adsorption zone, a desorption zone, and a regeneration zone. The two or more sector plate assemblies may define and/or separate the plurality of zones. The plurality of ducts define passageways into and out of the plurality of zones, and the peripheral section may connect an inlet of each duct of the plurality of ducts to an outlet of each duct of the plurality of ducts. Additionally, the housing includes structural reinforcements and thermal expansion elements. The structural reinforcements support the rotor, balance internal pressures in the housing, and/or dampen or eliminate tilting or deflections in the housing. The thermal expansion elements that allow the two or more sector plate assemblies to create seals between the plurality of zones. Thus, the housing may be able to support rotary adsorption operations on a large scale and/or industrial basis.

In some aspects, the structural reinforcements include a plurality of duct stiffeners that extends across the plurality of ducts to reinforce the plurality of ducts and dampen or eliminate tilting or deflections in the plurality of ducts. For example, the housing may include duct stiffeners for a particular duct of the plurality of ducts that extend from an outer flange of the particular duct to a lateral flange of the particular duct, spanning a corner of the particular duct. This may ensure that large ducts, sufficient to carry flows needed to conduct rotary adsorption operations on a large scale and/or industrial basis are stable and supported. Additionally or alternatively, the housing may include a plurality of peripheral stiffeners coupled, at least at one end, to the housing to reinforce the peripheral section and dampen or eliminate tilting or deflection in peripheral section. This may ensure that a large peripheral section, sufficient to support a large rotor needed to conduct rotary adsorption operations on a large scale and/or industrial basis are stable and supported.

In some aspects, the structural reinforcements include a bottom frame assembly with at least two girders, the at least two girders being positioned on opposite sides of a bearing assembly configured to rotatably support the rotor in the housing and configured to distribute a load of the rotor. Again, this may ensure that a large rotor, sufficient to conduct rotary adsorption operations on a large scale and/or industrial basis can be used for carbon capture applications. In some of these embodiments, the bearing assembly includes a jacking plate configured to lift and support the rotor to allow maintenance of the bearing assembly. Thus, the bearing assembly can be serviced without disassembling the entire rotary adsorption machine, which may be especially important for large scale operations.

Additionally or alternatively, the bearing assembly may include a bottom bearing cover and an upper bearing cover configured to define an oil bath therebetween while the upper bearing cover rotates with respect to the bottom bearing cover. Such a construction may facilitate use of a relatively large rotor. Still further, in some embodiments, the bottom frame assembly includes a center column positioned directly under the bearing assembly. This may redirect a load away from preexisting infrastructure, decreasing the cost of installing and support a large scale rotary adsorption machine.

Moreover, in at least some embodiments, the thermal expansion elements include pillars and a top plate of the housing. The pillars and top frame assembly may be at least partially expandable to accommodate and seal against the rotor as the rotor thermally expands and/or contracts. Thus, as temperature gradients form in the rotary adsorption machine, which may be particularly noticeable at large scales/dimensions, the housing may adapt to rotor turndown or other thermal expansion effects caused by the temperature gradients. Additionally or alternatively, the top frame assembly may include slots to allow heat to move through the top frame assembly, towards or away from the rotor. This may increase the heating of the top frame assembly so that thermal expansion of the top frame assembly can match thermal expansion of the rotor. As an example, the slots can include two rows of slots that provide inlets and outlets to a channel defined within the top frame assembly.

Additionally or alternatively, the thermal expansion elements may include a thermally expandable bottom sector plate included in a bottom frame assembly of the housing. This may allow the bottom sector plate to deflect with respect to a bottom frame assembly, which may often be unheated and, thus, may experience a temperature differential as compared to the bottom sector plate. In at least some embodiments, this is achieved by fixedly coupling a center of the thermally expandable bottom sector plate to a girder of the bottom frame assembly while movably coupling extensions of the thermally expandable bottom sector plate to the girder. Thus, the rotor will remain adequately and stably supported while the bottom sector plate also matches rotor turndown or other thermal expansion effects.

According to yet other embodiments, the present application may be drawn to a rotary adsorption machine including any of the preceding housing features and a rotor configured to receive adsorptive materials and to rotate the adsorptive materials within the housing. When the rotary adsorption machine includes the aforementioned features, it may also realize the associated advantages. In some of these embodiments, the rotary adsorption machine is an industrial rotary adsorption machine with a rotor spanning at least 20 meters in diameter. Thus, the rotary adsorption machine may provide increased carbon capture, among other functionality, at least as compared to smaller machines. Additionally or alternatively, the rotary adsorption machine may include a drive unit positioned above the rotor. The drive unit may include a bearing that is serviceable and/or removable from the drive unit without removing a shaft of the drive unit. Such servicing may be especially important for large scale operations.

These and other advantages and features will become evident in view of the drawings and detailed description.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

Figure 1:
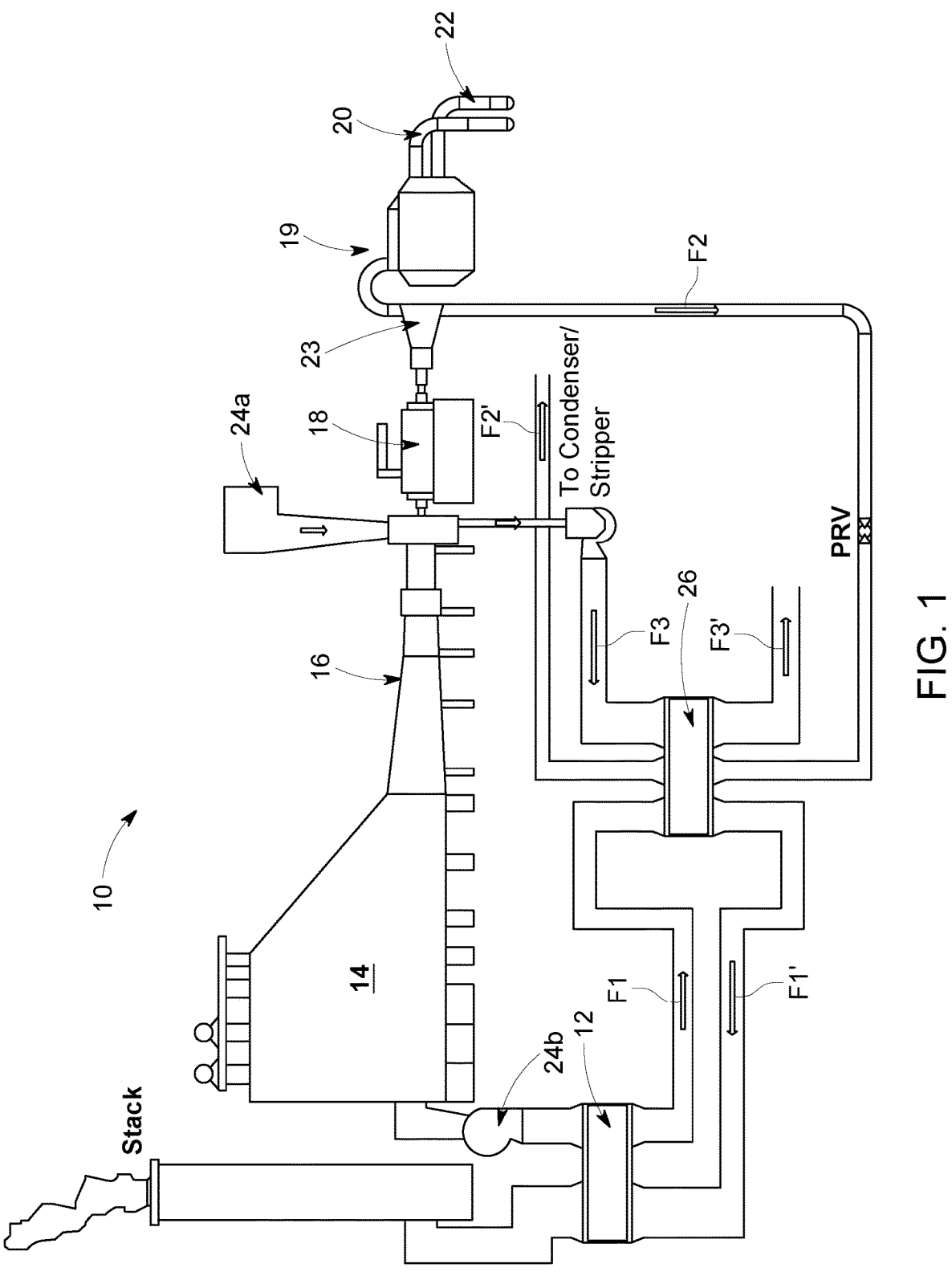
FIG. 1 is a schematic view of a combined cycle power plant with a rotary adsorption machine (RAM) formed in accordance with an example embodiment of the present application.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Generally, this application is directed to a large scale rotary adsorption machine (RAM). Such a machine will be particularly useful for large scale (e.g., industrial) carbon capture machines, which, to date, have been difficult to build since large scale machines create temperature, pressure, and force distribution problems, among other issues. In fact, these issues only become exacerbated as the RAM increases in size. The housing and RAM presented herein resolve these issues by providing structural reinforcements, thermally expandable elements, and other such features that will allow large scale RAMs to operate effectively and efficiently.

An example power plant 10 of a type that may incorporate a rotary adsorption machine 26 formed in accordance with the present application is illustrated in FIG. 1. However, to be clear, the power plant 10 of FIG. 1 is merely an example and, in other embodiments, rotary adsorption machine 26 may be positioned in any desirable location, e.g., for carbon capture. For example, power plant 10 generally depicts a combined cycle gas turbine (CCGT) power plant, but the rotary adsorption machine 26 could also be positioned/included in a conventional coal powered power plant or any other flue system (e.g., for point source capture). In fact, it is envisioned that the rotary adsorption machine 26 presented herein may be configured to capture carbon dioxide from ambient air. That is, the rotary adsorption machine 26 presented herein may be positioned in locations in which $CO_2$-laden gas entering the rotary adsorption machine 26 is ambient air (as opposed to a process effluent).

That said, in FIG. 1, the power plant 10 includes a gas turbine 16, a Heat Recovery Steam Generator (HRSG) 14 coupled with a steam turbine 23. Turbines 16 and 23 combine to drive the generator 18 to produce electricity. The steam turbine 23 is connected to a condenser 19 with an intake 20 and exhaust 22. The power plant 10 also includes fans 24a and 24b, which may be used to move air through this system. Meanwhile, a heat exchanger 12 may be positioned adjacent the exhaust of the HRSG 14. Although not shown, a power plant utilizing the RAM 26 might also include another heat exchanger to heat the air entering a boiler. For example, such a heat exchanger might heat air entering a boiler with heat from combustion gases expelled from the boiler (while also cooling the gas expelled from the boiler).

Figure 2:
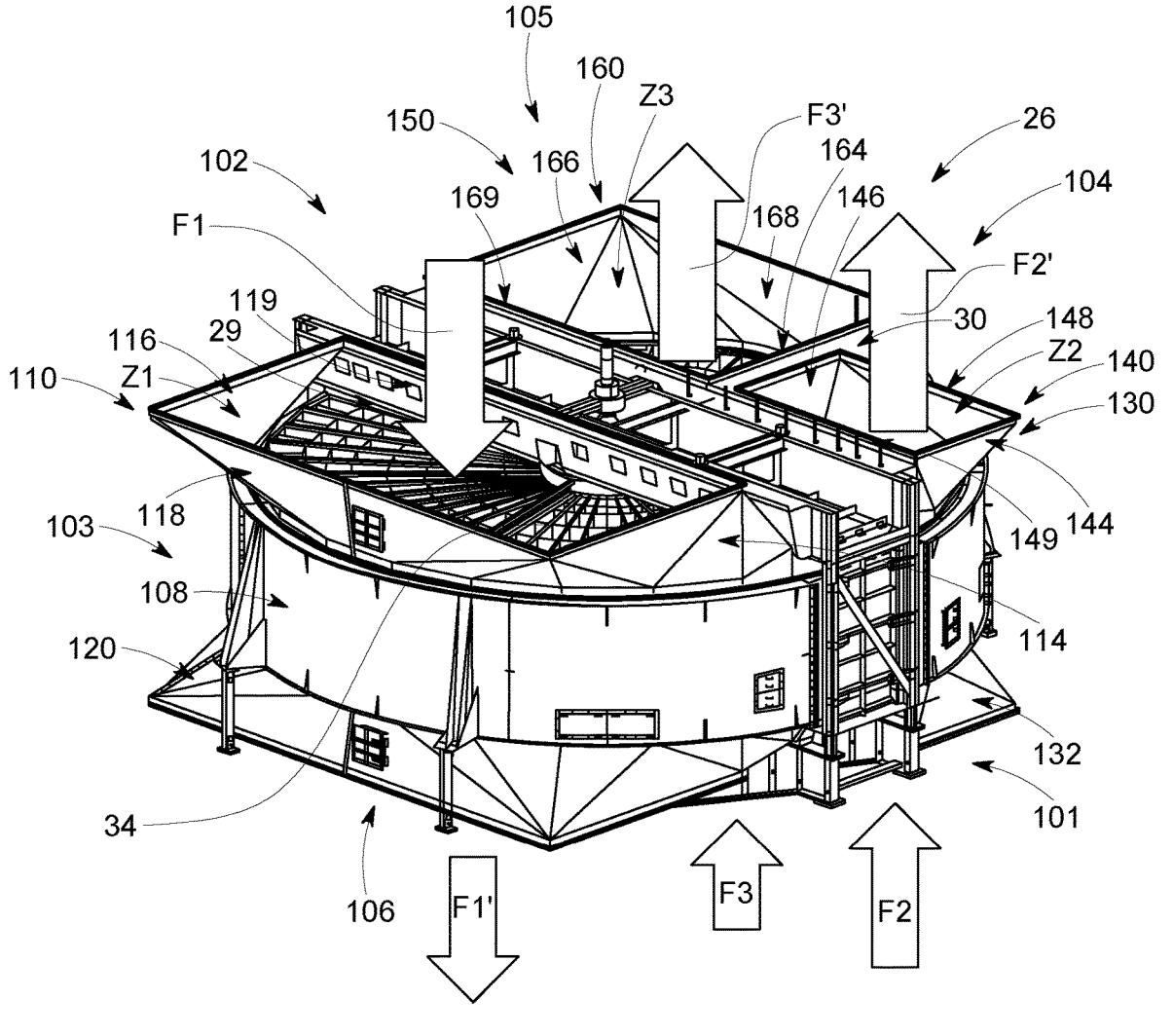
FIG. 2 is a top, front perspective view of a RAM formed in accordance with an example embodiment of the present application.

As is shown in a combination of FIGS. 1 and 2, the cooled exhaust gas enters the rotary adsorption machine 26 as a first flow F1 and enters the rotary adsorption machine 26 via a first duct 110. However, to reiterate, exhaust gas is merely one example of gas that may enter the rotary adsorption machine 26 as first flow F1. As other examples, the first flow F1 may be a flow of ambient air and/atmosphere, or a combination of ambient air/atmosphere and an exhaust gas. In any case, when the first flow F1 encounters a rotor 34 included in the rotary adsorption machine 26, adsorptive elements in the rotor 34 can adsorb a specific portion of flow F1 (e.g., carbon dioxide). Then, the adsorptive elements in the rotor 34 can carry the adsorbed portion of flow F1 through a partial rotation. Meanwhile, a portion of the first flow F1 that is not captured by the adsorptive elements may exit the rotary adsorption machine 26 as process flow F1', e.g., to (or back to) atmosphere, e.g., by way of heat exchanger 12 where it can be used to cool exhaust gas. Additionally or alternatively, flow F1' could be fed to a conduit that directs the flow F1' to a downstream processing operation that require clean gas/air. The area of the rotor 34 aligned with the first flow F1 may generally be referred to herein as a first zone Z1 (i.e., an adsorptive zone Z1) of the rotary adsorption machine 26.

As the rotor 34 rotates the adsorbed portion of flow F1 (e.g., carbon dioxide) out of the adsorptive zone Z1 (e.g., by rotating the adsorptive elements that have adsorbed the portion of flow F1), the adsorbed portion of flow F1 moves into a second zone Z2 (i.e., a desorption zone Z2) of the rotary adsorption machine 26. In the desorption zone Z2, a second fluid flow F2 is directed into the rotary adsorption machine 26 to cause the adsorptive elements of rotor 34 carrying the adsorbed portion of flow F1 to desorb the adsorbed portion of flow F1. For example, steam may be directed into the rotary adsorption machine 26 as flow F2 to create a temperature change that releases carbon dioxide from adsorptive elements for carbon capture. To illustrate this example, the steam of flow F2 emanates from steam turbine operations (e.g., from condenser 19) in FIG. 1. In any case, the flow F2' exiting rotary adsorption machine 26 may carry carbon dioxide and may directed to a storage tank, condenser, and/or stripper, e.g., to prevent the carbon dioxide from entering or re-entering the atmosphere (e.g., to remove carbon dioxide from the atmosphere).

After adsorptive elements desorb the adsorbed portion of flow F1 (e.g., carbon dioxide), the adsorptive elements may move into a third zone Z3 (i.e., a regeneration zone Z3). In the third zone Z3, conditioning air (e.g., driven by fan 24a) may flow through the rotary adsorption machine 26 to "regenerate" the adsorptive elements, entering as flow F3 and exiting as flow F3' (which, may, in some instances, may combine with flow F1' on exiting the rotary adsorption machine 26, as shown in FIG. 1). This conditioning air prepares the adsorptive elements to re-enter the adsorption zone Z1 (e.g., by cooling the adsorptive elements) so that the adsorptive elements can continue cycling through the three zones of the rotary adsorption machine 26. That is, continued rotation of a particular adsorptive element of rotor 34 through a full 360° rotation within the rotary adsorption machine 26 will cause the particular adsorptive element to adsorb a specific portion of a flow F1, desorb the flow component, and regenerate. Thus, a cylindrical rotor 34 full of adsorptive elements will continuously capture a component/portion of a first flow of gas F1 entering the rotary adsorption machine 26.

However, to be clear, the rotary adsorption machine 26 illustrated in the Figures of this application is merely an example and other embodiments may include any number of variations. For example, a rotary adsorption machine 26 formed in accordance with the present application may include any number of zones, e.g., to incorporate isolation zones, multiple stages or regeneration, desorption, and/or adsorption, or for any other reason. Additionally or alternatively, the various flows entering and exiting the rotary adsorption machine 26 may emanate from any desirable source or flow to any desirable location, including a source of that flow or another flow (e.g., to recycle flows of fluid). As yet another example, the composition of the various flows can be varied, such as by using a fluid flow other than steam for desorption.

Figure 3:
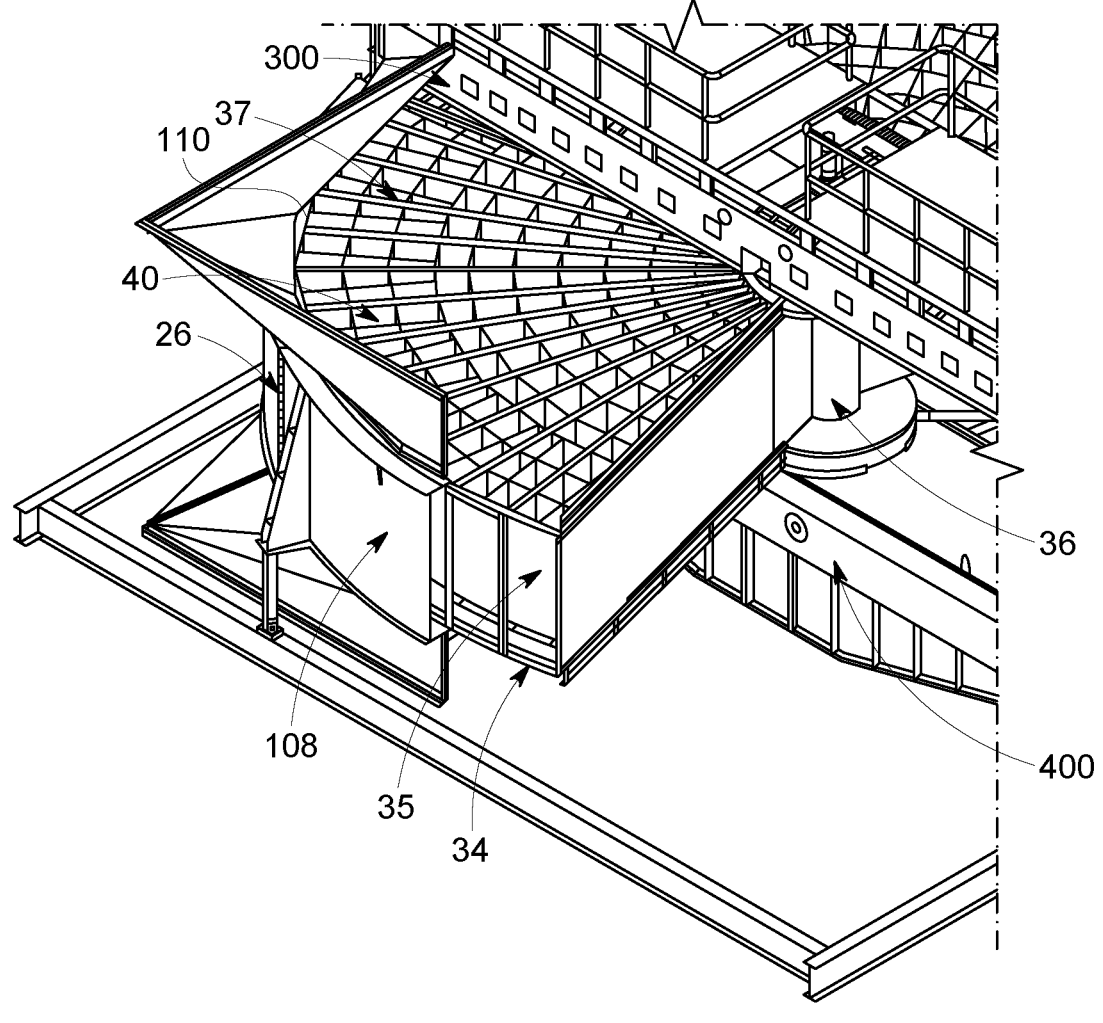
FIG. 3 is a partially cut-away perspective view of a portion of the RAM of FIG. 2.
Figure 4:
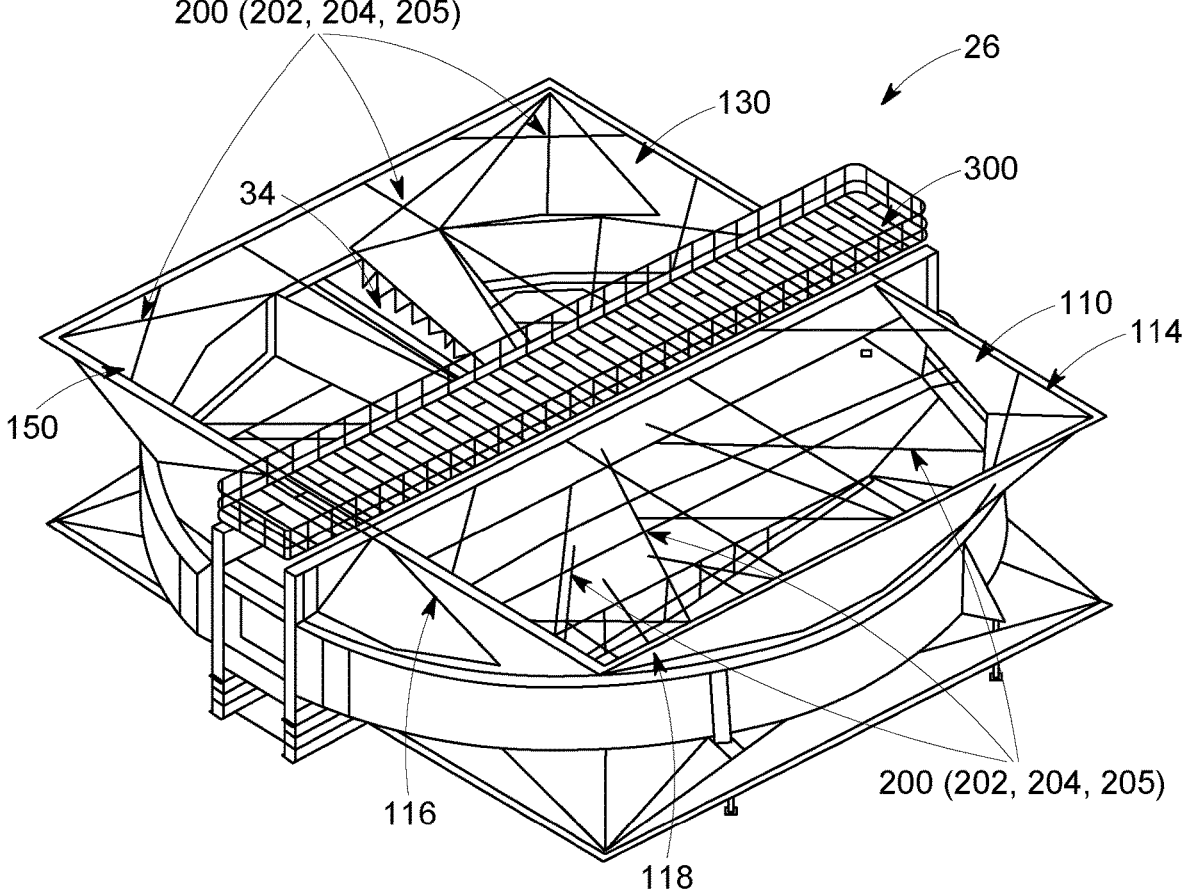
FIG. 4 is a top, side perspective view of a portion of the RAM of FIG. 2.

FIGS. 2 and 3 illustrate the rotary adsorption machine 26 of FIG. 1 in further detail, with FIG. 2 providing a top perspective view of the rotary adsorption machine 26 and FIG. 3 providing a cut-away view of a portion of the rotary adsorption machine 26. At a high-level, the rotary adsorption machine 26 includes a rotor 34 that is rotatable within a housing 100. The housing 100 is specifically designed to enclose and seal against portions of the rotor 34 to help dictate how and where fluid (e.g., gas) will enter, exit, or move with the rotor 34. As mentioned, the RAM 26 presented herein, including the housing 100 and rotor 34 may be particularly suitable for large scale (e.g., industrial) operations. Thus, in at least some instances, the rotor 34 may have a diameter equal to or greater than 20 meters, such as 24 meters, and the housing 100 may be sized accordingly.

As can be seen in FIG. 3, the rotor 34 includes a central hub 36 and an outer shell 35. Radial plates 37 extend between the central hub 36 and the outer shell 35 to at least partially define containers 40 within which adsorbent material may be retained. In at least some embodiments, the rotor 34 also includes circumferential plates to subdivide the containers 40. Either way, adsorbent material may be stored and/or installed within the containers 40. For example, adsorbent material may be "dropped down" into the containers 40 to fill the rotor 34 with adsorbent material. In at least some instances, the adsorbent may be formed from any adsorbent now known or developed hereafter that is suitable for adsorbing carbon dioxide, such as activated carbon, MOFs, zeolite(s), or combinations thereof.

As mentioned, the rotor 34 is configured to continuously rotate around the central hub 36 to move radially aligned containers 40 through a cycle of zones (e.g., through zones Z1, Z2, and Z3). During this rotation, the housing 100 is generally designed to circumferentially retain gas in the rotor 34 and to create pathways along which fluid can axially enter or exit the rotor. The circumferential retention can be achieved by closing positioning a peripheral section 108 of the housing 100 against the outer shell 35 of the rotor 34 and/or with sector plate assemblies 29 and 30, which are described further below. However, to be clear, the peripheral section 108 need not be completely cylindrical and may, instead, be octagonal, hexagonal, partially cylindrical, stadium shaped, otherwise comprised of at least two curved portions, etc. Additionally or alternatively, axial seal plates, axial seals, and/or circumferential seals may be positioned between the rotor 34 and the outer shell 35 to prevent leakage therebetween (e.g., leaf seals, contact seals, etc.).

Moreover, during rotation of rotor 34, radial plates 37 of rotor 34 rotate through one or more sector assemblies that delineate the different zones within housing 100. In the depicted embodiment, a first sector assembly 29 separates the first zone Z1 (generally aligned with first duct 110) from both the second zone Z2 (generally aligned with second duct 130) and the third zone Z3 (generally aligned with third duct 150). Additionally, a second sector assembly 30 separates the second zone Z2 and the third zone Z3. Thus, during rotation, the heat transfer element containers 40 in the rotor 34 move in or out of the first zone Z1 (e.g., from third zone Z3 or to second zone Z2) by passing through sector assembly 29. Meanwhile, the heat transfer element containers 40 in the rotor 34 move from the second zone Z2 to the third zone Z3 by passing through sector assembly 30. However, in other instances, one or more sector assemblies could delineate any number of sectors in the annular space between the rotor hub 36 and the peripheral section 108 of housing 100 (e.g., for a tri-sector, quad-sector, etc. RAM).

Moreover, in the depicted embodiment, sector assemblies 29 and 30 are each supported, at least in part, by a top frame assembly 300 and bottom frame assembly 400 (each of which is described further below). But, in other embodiments, the housing 100 may include no supports or any other desirable supports. Also, while the Figures sometimes illustrate portions of the first sector assembly 29 (e.g., top sector plate 350 or bottom sector plate 450) supported by top frame assembly 300 and/or bottom frame assembly 400 without necessarily showing like parts of second sector assembly 30, it should be understood that sector assemblies 29 and 30 may be supported in like or different manners within a single housing 100.

Now turning to FIGS. 2 and 3, overall, the housing 100 extends from a front 101 to a back 102, from a first side 103 to a second side 104, and from a bottom 106 to a top 105. In the depicted embodiment, different streams of fluid enter or exit the rotary adsorption machine 26 in a generally vertical or longitudinal manner (i.e., from the bottom 106 to the top 105, or vice versa). Thus, the housing 100: (a) includes a peripheral section 108 that circumferentially surrounds the rotor 34; and (b) defines a plurality of ducts at the top 105 and bottom 106 of the rotary adsorption machine 26. Specifically, in the depicted embodiment, the rotary adsorption machine 26 includes three ducts that are generally aligned with zones Z1, Z2, and Z3: (1) a first duct 110 generally aligned with adsorption zone Z1; (2) a second duct 130 generally aligned with desorption zone Z2; and (3) a third duct 150 generally aligned with the regeneration zone Z3. However, other embodiments may include any number of ducts and do not necessarily need to include the same number of ducts and zones.

In the depicted embodiment, the first duct 110 extends from an inlet 112 disposed adjacent a top 105 of the housing 100 to an outlet 120 disposed adjacent a bottom 106 of the housing 100. Meanwhile, the second duct 130 and third duct 150 extend from inlets 132 and 152 (see FIG. 7), respectively, that are positioned adjacent a bottom 106 of the housing 100 to outlets 140 and 160, respectively, that are positioned adjacent a top 105 of the housing 100. Thus, the flow F1 entering the first duct 110 generally flows in a first longitudinal direction (e.g., downwards) while flows F2 and F3 entering ducts 130 and 150 generally flow in an opposite longitudinal direction (e.g., upwards). As specific examples, the first flow F1 may comprise ambient air and/or a process effluent flowing downwards into the rotor 34 via the inlet 112 of the first duct 110 while the second flow F2 comprises steam flowing upwards into the rotor 34 via the inlet 132 of second duct 130 and the third flow F3 comprises conditioning air flowing upwards into rotor 34 via the inlet 152 of third duct 150.

Each of ducts 110, 130, and 150 includes an inlet and outlet formed from mirrored flanges. For brevity, these flanges are only described with respect to inlet 112, outlet 140, and outlet 160. However, such description should also apply to outlet 120, inlet 132, and inlet 152, as appropriate. First, the inlet 132 of the first duct 110 is generally formed from a front flange 114 and a back flange 116 that are interconnected by an outer flange 118 and inner flange 119. Each of the flanges may be tapered or angled in any manner, but generally define a rectangular cross-sectional inlet aligned with the adsorption zone Z1. Next, the outlet 140 of the second duct 130 is generally formed from a front flange 144 and a back flange 146 that are interconnected by an outer flange 148 and inner flange 149. Similarly, the outlet 160 of the third duct 150 is generally formed from a front flange 164 and a back flange 166 that are interconnected by an outer flange 168 and inner flange 169. Again, each of these flanges may be tapered or angled in any manner, but generally extend from a first rectangular cross-section to a second rectangular cross-section. The cross-section of the second duct 130 is generally aligned with the desorption zone Z2 while the cross-section of the third duct 150 is generally aligned with regeneration zone Z3.

Now turning generally to FIGS. 4-16, the housing 100 of the rotary adsorption machine 26 presented herein includes structural reinforcements that support the rotor, balance internal pressures in the housing, and/or dampen or eliminate tilting or deflections in the housing. FIGS. 4-16 depict a variety of different features that comprise structural reinforcements and each of these features are addressed in turn below. While some of these features are depicted alone and/or with only a portion of rotary adsorption machine 26, such presentation is only intended to clearly depict that particular feature and it should be understood that these features are combinable and/or usable in any desirable manner.

First, FIGS. 4-8 depict one example type of structural reinforcement in the form of stiffeners 200. These stiffeners 200, which may be tubular or have any other elongate shape, can balance the internal pressures created by various fluid streams (e.g., streams F1, F2, and F3) flowing through the rotary adsorption machine 26. Generally, high static pressures and pressure differentials between streams F1, F2, and F3 may cause the rotary adsorption machine 26 to tilt and deflect; however, stiffeners 200 may resist, dampen, or eliminate such tilting and/or deflection. In fact, the inventors have found that strategically positioned stiffeners 200 can eliminate any tilting and/or deflection that negatively impacts operations of industrial sized rotary adsorption machines 26, including machines 26 having a rotor 34 up to approximately 24 meters in diameter.

Stiffeners 200 generally comprise a set of elongate structures strategically positioned in ducts 110, 130, 150 and/or the peripheral section 108. The positions of these stiffeners 200 was determined through Euler analyses aimed at ensuring stresses in the housing 100 are within limits that ensure continued and efficient operation of the rotary adsorption machine 26. Thus, stiffeners 200 are positioned in ducts to generally extend between flanges of that duct and include lateral stiffeners 202 and corner stiffeners 204. Meanwhile, stiffeners 200 in the peripheral section 108 generally extend across a radius of the rotor 34 and are referred to as peripheral stiffeners 205. Each type is addressed in turn below.

Figure 5:
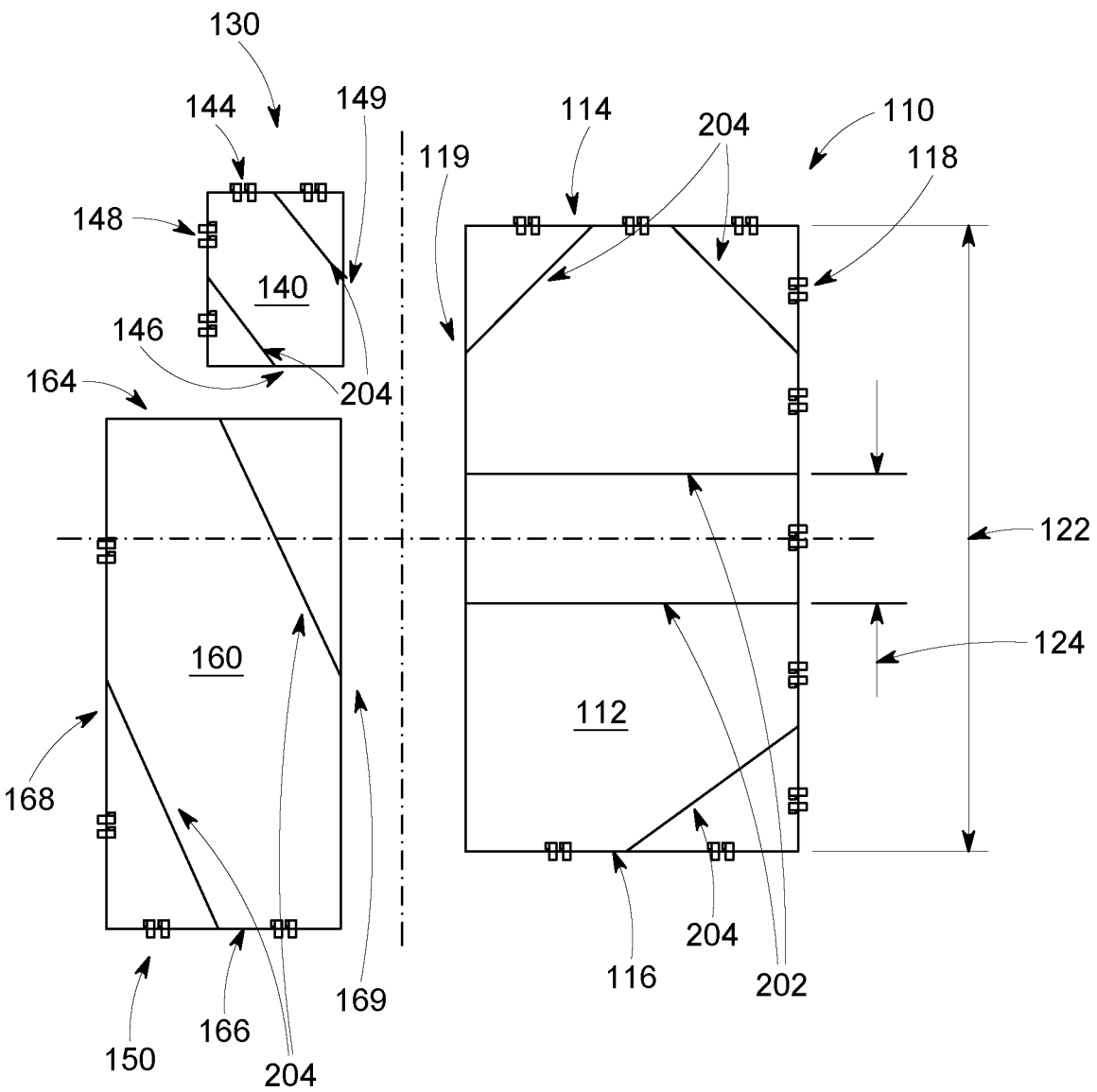
FIG. 5 is a schematic illustration of ducts included in the RAM of FIG. 2, the schematic generally illustrating a top plan view of the ducts.

First, as is shown in the schematic view of FIG. 5, which generally depicts ducts 110, 130, and 150 in a top plan view, lateral stiffeners 202 and corner stiffeners 204 may reinforce and stabilize ducts. In the depicted embodiment, only first duct 110 includes lateral stiffeners 202, which extend from the outer flange 118 to the inner flange 119. However, in other embodiments, any duct may include lateral stiffeners 202. Notably, with the lateral stiffeners 202 placed as shown, an unsupported major dimension of the first duct 110 shrinks from dimension 122 to dimension 124. This may prevent, or at least discourage, the relatively long first duct 110 from deforming, tilting, deflecting, or otherwise becoming compromised along its major dimension by pressure in first duct 110 and/or by pressure differentials acting on first duct 110.

Additionally, in the depicted embodiment, corner stiffeners 204 interact with every flange of the various ducts to support these ducts against deformation, tilting, deflection, or otherwise becoming compromised. In the depicted embodiment, the first duct 110 includes three corner stiffeners 204, with one extending between the front flange 114 and the inner flange 119, one extending between the back flange 116 and the inner flange 119, and one extending between the front flange 114 and the outer flange 118. Meanwhile, duct 130 and duct 150 each include two corner stiffeners 204. In second duct 130, corner stiffeners 204 extend between the front flange 164 and the inner flange 169 and between the outer flange 168 and the back flange 166. In third duct 150, corner stiffeners 204 extend between the front flange 144 and the inner flange 149 and between outer flange 148 and the back flange 146. Thus, the corners of each duct, which may suffer tilting or deformation in response to corner effects created by pressure gradients in the ducts, may be prevented from tiling or deforming.

Figure 6:
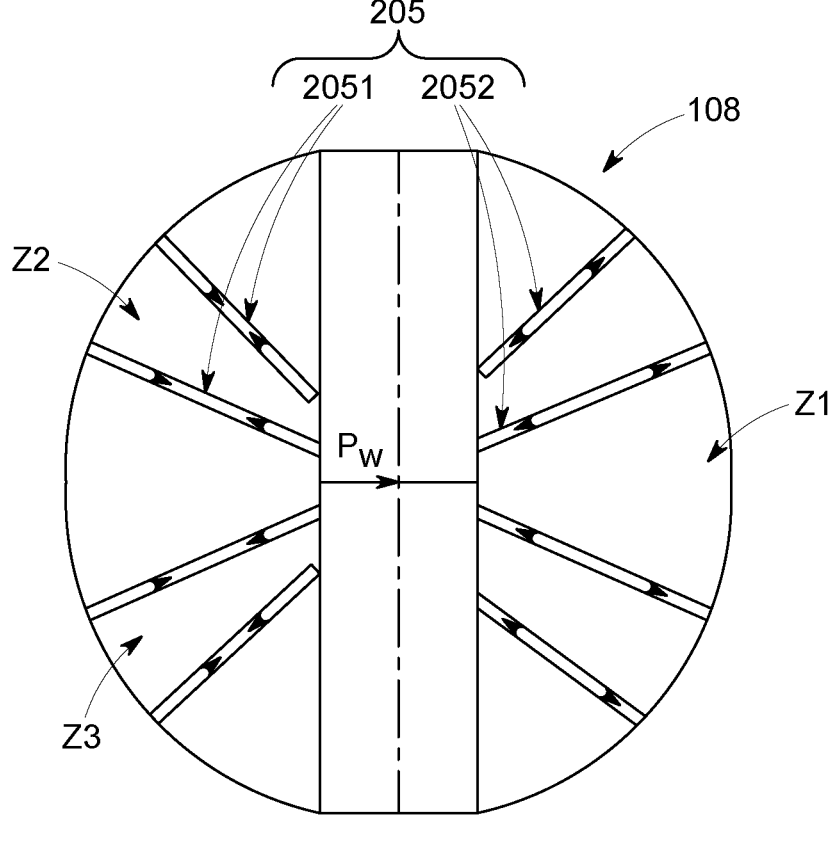
FIGS. 6 and 7 are schematic illustrations of a peripheral section of a housing of the RAM of FIG. 2, with FIG. 6 generally illustrating a top plan view of the peripheral section and FIG. 7 generally illustrating a side, sectional view.
Figures 7, 8:
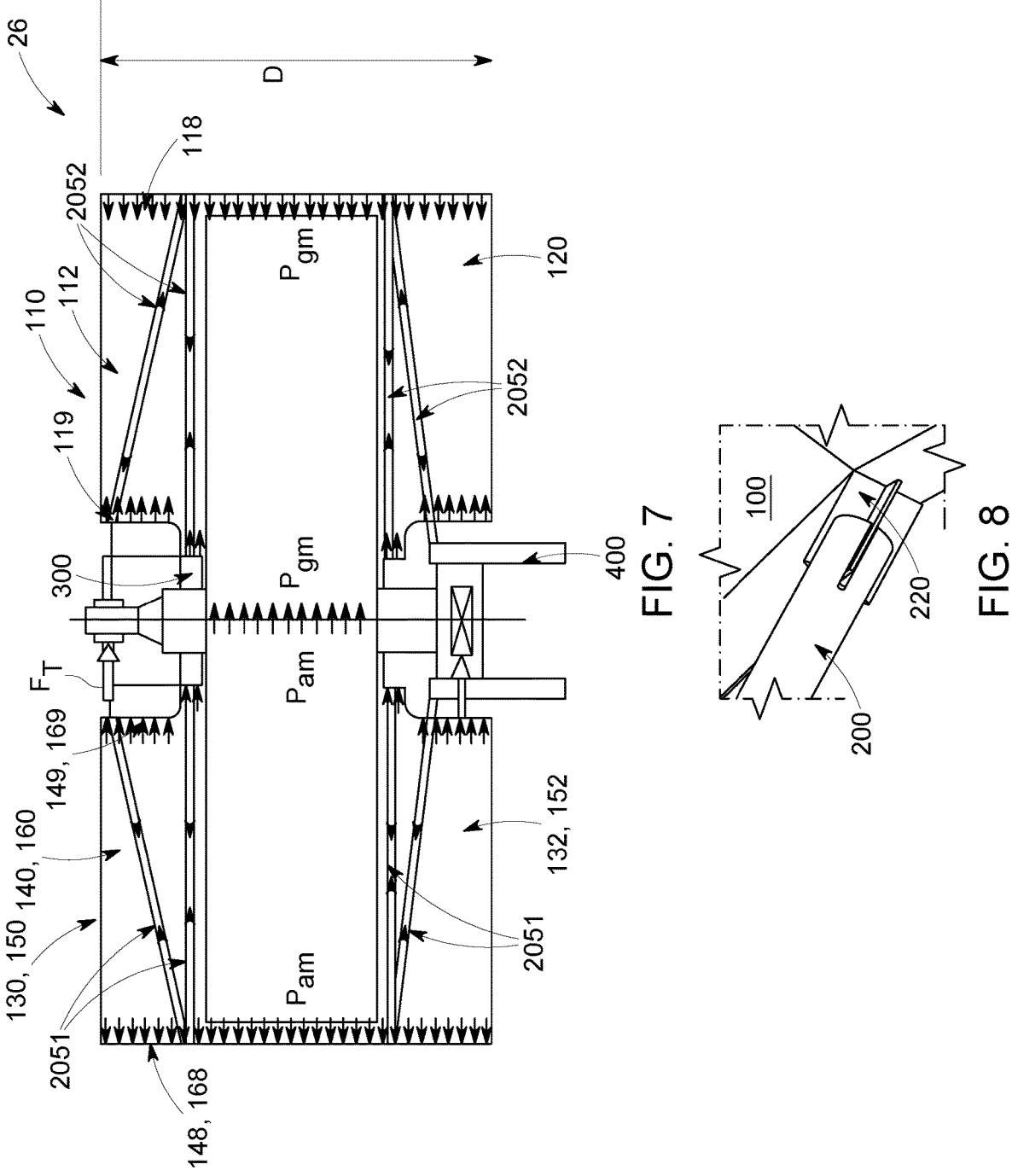
FIG. 8 is a detail view of a portion of a stiffener included in the RAM of FIG. 2.

Second, as can be seen in the schematic views of FIGS. 6 and 7, peripheral stiffeners 205 are configured to support the peripheral section 108 and prevent the peripheral section 108 from deforming, tilting, deflecting, or otherwise becoming compromised by pressure in peripheral section 108 and/or in the rotor 34. The peripheral stiffeners 205 generally extend from an outer, curved portion of the peripheral section 108 to a central portion of the peripheral section 108, terminating at a central portion of the peripheral section 108 and/or at another central portion of the housing 100, e.g., at a portion defined by the top frame assembly 300 or the bottom frame assembly 400.

Some of the peripheral stiffeners 205 extend in a planar manner (e.g., some are flat or horizontal) while other peripheral stiffeners 205 are angled. In the depicted embodiment, the locations and orientations of these peripheral stiffeners 205 are carefully selected, based on extensive analysis, to minimize the number and size of peripheral stiffeners 205 while also minimizing any tilting or deflection of the peripheral section 108. Moreover, and perhaps more importantly, different stiffeners 205 may have different configurations that act against compression or tension.

Specifically, in the depicted embodiment, peripheral stiffeners 205 that are generally aligned with the first duct 110 (i.e., extending across the first zone Z1, which may be a "gas side") may be struts 2052 configured to resist compression. This may be beneficial because a pressure (e.g., $P_{gm}$) on the gas side of the housing 100 (e.g., the first zone Z1) may be relatively negative as compared to a pressure (e.g., $P_{am}$) on the air side of the housing 100 (e.g., the side generally defined by zone Z2 and zone Z3). By comparison, peripheral stiffeners 205 generally aligned with zone Z2 and zone Z3 (i.e., extending across a gas side of housing 100) may be ties 2051 configured to resist tension. This may be beneficial because a relatively positive pressure on the air side of the housing 100 may generate forces urging expansion of the housing 100 on the air side. Put another way, the ties 2051 may have a relatively high tensile strength while the struts 2052 have a relatively high compressive strength (e.g., relative to each other).

Now turning to FIG. 8, in various embodiments, the stiffeners 200 may be coupled to the housing 100 in various manners, but FIG. 8 shows one example connection. The connection 220 shown in FIG. 8 is a cruciform-style connection 220 that provides a rigid coupling between the housing 100 and the stiffeners 200. This prevents the stiffeners 200 from rotating or otherwise moving while trying to prevent such movement of the housing 100.

Figure 9:
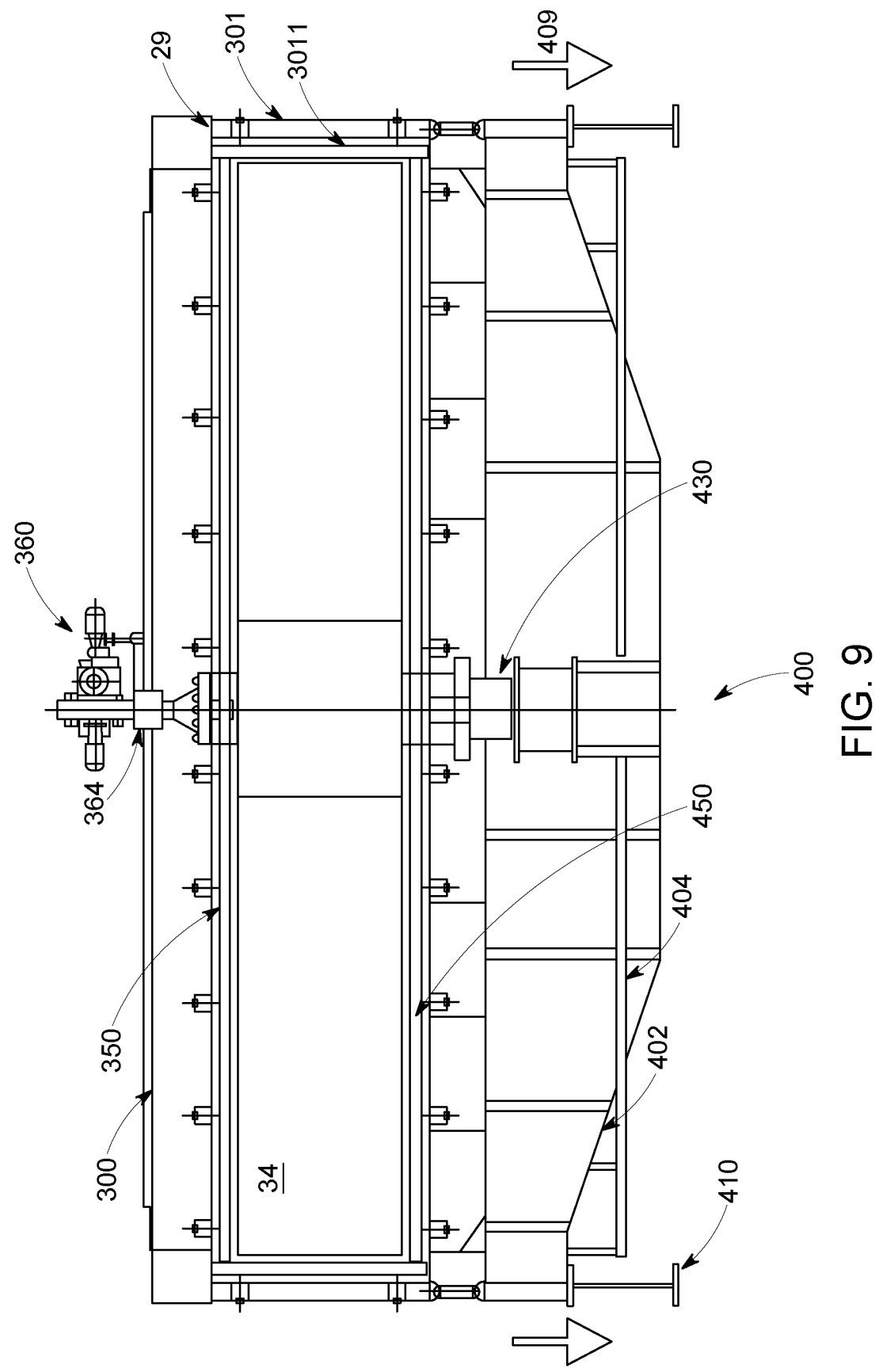
FIG. 9 is a side view of a first embodiment of a frame assembly that may be included or incorporated in the RAM of FIG. 2, according to an example embodiment.
Figure 10:
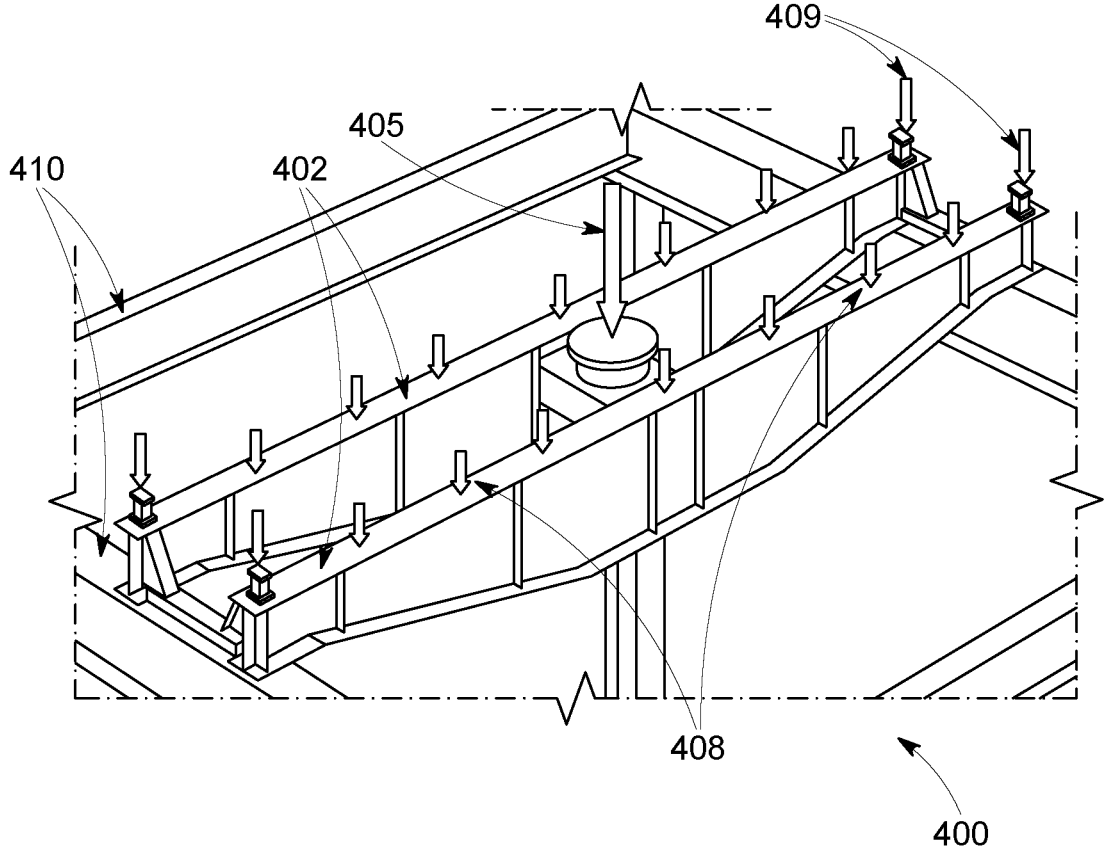
FIG. 10 is a top perspective view of the frame assembly of FIG. 9.
Figure 11:
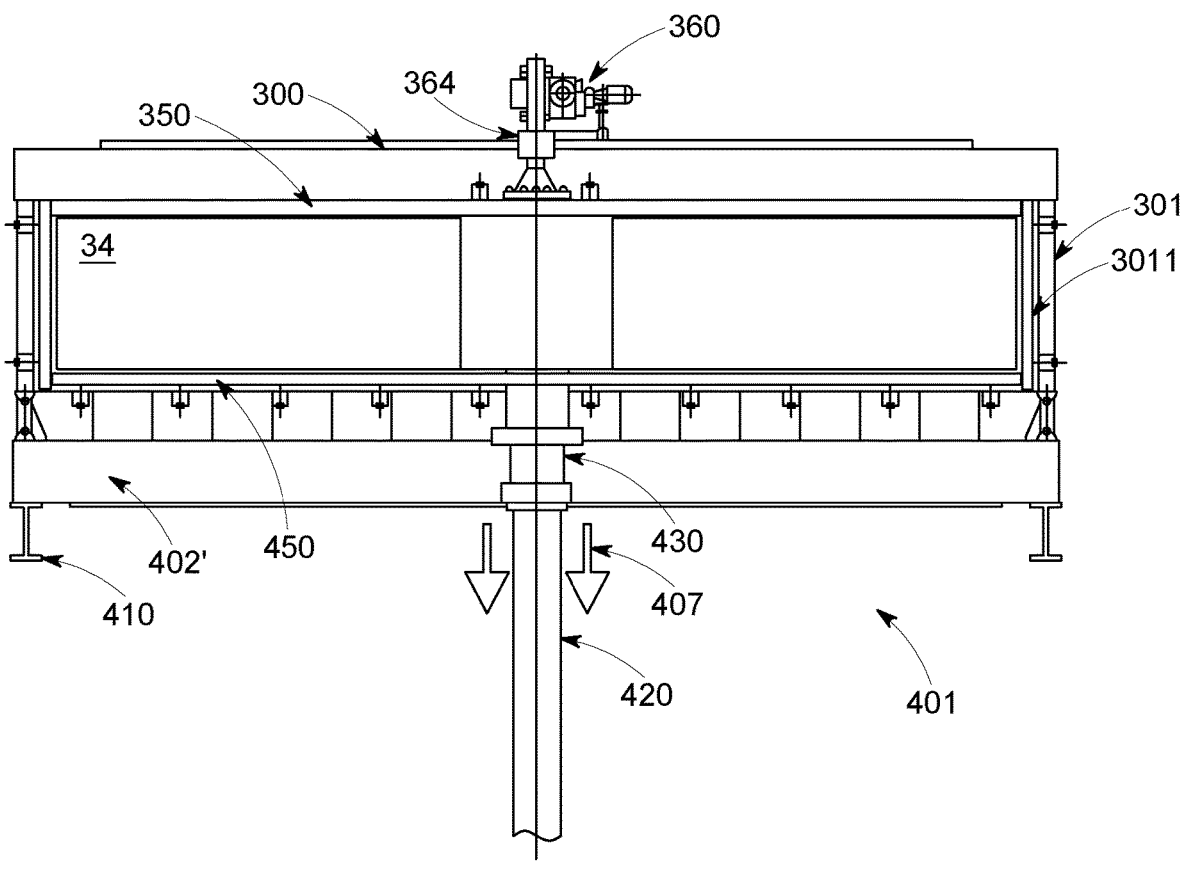
FIG. 11 is a side view of a second embodiment of a frame assembly that may be included or incorporated in the RAM of FIG. 2, according to an example embodiment.
Figure 12:
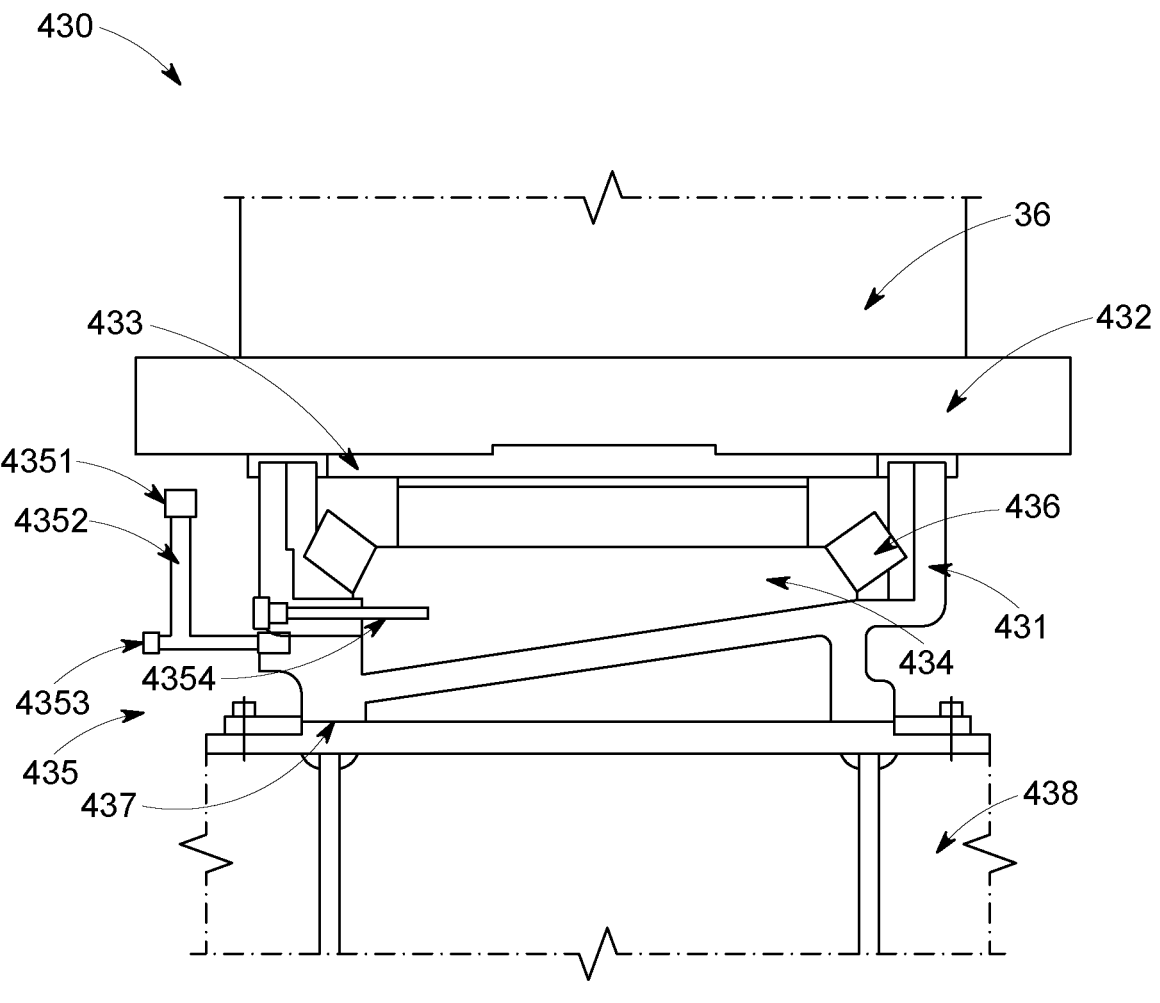
FIG. 12 is a side, sectional view of a bearing assembly that may be included in a bottom frame assembly of the RAM of FIG. 2, such as the bottom frame assemblies illustrated in FIGS. 9-11, according to an example embodiment.

Now turning to FIGS. 9-12, these Figures depict at least two embodiments of bottom frame assemblies that can be included or incorporated into housing 100 to provide another type of structural reinforcement, either in lieu of or in combination with stiffeners 200 (or any other feature described hereafter). FIGS. 9 and 10 provide side and top perspective views of a first embodiment a bottom frame assembly 401. FIG. 11 provides a side perspective view of a second embodiment of a bottom frame assembly 401. FIG. 12 provides a schematic, sectional view of a bearing assembly 430 that can be included in at least the bottom frame assemblies 400 and 401.

First, the bottom frame assembly 400 depicted in FIGS. 9 and 10 includes two girders 402 that extend on either side of a bearing assembly 430, supporting the bearing assembly 430 in a twin beam supported arrangement. However, before describing these features, it is important to understand the overall structure shown in FIG. 9, which generally illustrates the sector plate assembly 29 bordering the first zone Z1, but may also be representative of the second sector plate assembly 30 between zone Z2 and zone Z3. As can be seen, the bottom frame assembly 400 and the top frame assembly 300 generally support and sandwich the rotor 34, with a top sector plate 350 engaging a top of the rotor 34 and a bottom sector plate 450 engaging a bottom of the rotor 34. Between bottom sector plate 450 and top sector plate 350, pillars 301 may interconnect the top frame assembly 300 and the bottom frame assembly 400. As an example, FIG. 9 illustrates the pillars 301 in combination with an axial seal plate 3011 that, together with top sector plate 350 and bottom sector plate 450, creates a seal between adjacent zones of the rotary adsorption machine 26. Thus, in some instances, pillars 301 may be considered part of a sector plate assembly.

Additionally, the top frame assembly 300 and bottom frame assembly 400 generally support the rotor 34 for rotation. Thus, the top frame assembly 300 includes a top bearing assembly 364 while the bottom frame assembly 400 includes a bottom bearing assembly 430. The top bearing assembly 364 generally sits between a drive unit 360 and the rotor 34 and supports the rotor 34 for rotation that is driven by the first drive unit 360. Meanwhile, the rotor 34 generally rotates atop the bottom bearing assembly 430 and, thus, the bottom bearing assembly 430 supports the mass of the rotor 34, including a mass of any adsorbents installed therein. Consequently, it is critical that the bottom bearing assembly 430 properly supports the rotor 34, especially for the large rotors 34 anticipated by the present application. At the same time, the bearing assembly 430 may require regular maintenance and, thus, the bottom frame assembly 400 must allow access to the bearing assembly 430. To illustrate this concept, the bottom frame assembly 400 is depicted with an access platform 404 that extends around and between girders 402 to allow access the bearing assembly 430. However, such a platform is not necessary and any other platforms, lifts, or other access features may be included (or omitted) in or on the housing 100 or RAM 26 presented herein.

Now turning to the structural reinforcement provided by the bottom frame assembly 400 of FIGS. 9 and 10 (and primarily in FIG. 10), since the girders 402 support the bearing assembly 430, the load 405 acting on the bearing assembly 430 transfers to the girders 402. The girders 402 are tapered to optimize for strength while minimizing deflection and buckling and can evenly distribute the overall load 405 along a span of the girders 402, as is schematically depicted by arrows 408. Moreover, the girders 402 sit atop of pre-existing infrastructure 410 (e.g., steel work at a site) and can transfer the load to this pre-existing infrastructure 410, as is depicted by arrows 409. Consequently, the bottom frame assembly 400 is particularly suited to support a heavy and large rotor 34.

FIG. 11 depicts another embodiment of a bottom frame assembly 401 that can support load 405. Overall, the bottom frame assembly 401 is relatively similar to the bottom frame assembly 400. Also, bottom frame assembly 401 can be incorporated into a housing 100 including the same top frame assembly 300 as bottom frame assembly 400. Thus, elements of FIG. 11 are generally labeled with the same reference numerals as used in FIGS. 9 and 10 when applicable while different reference numerals emphasize differences between bottom frame assembly 401 and bottom frame assembly 400.

Perhaps most notably, bottom frame assembly 401 includes a center column 420 that extends directly beneath the bearing assembly 430. The load 405 primarily acts through the center column 420, as indicated by arrows 407. Consequently, the load 405 need not be entirely supported and distributed along girders 402' and the girders 402' can be substantially smaller than girders 402, reducing the cost, weight, and maneuverability of the girders 402', at least as compared to girders 402. In fact, in at least some instances, the center column 420 may allow the pre-existing infrastructure 410 to be minimized, removed, or otherwise reduced, providing cost savings for the end user/operator. Additionally or alternatively, with the center column 420, the girders 402' need not be twin girders disposed on either lateral side of bearing assembly 430. For example, the girders 402' may comprise a single girder with a Y- or V-shape. At the same time, the bottom frame assembly 400 may also be particularly suited to support a heavy and large rotor 34.

FIG. 12 illustrates a bearing assembly 430 that may be included in bottom frame assembly 400, bottom frame assembly 401, or any other bottom frame assembly suitable for the rotary adsorption machine 26 presented herein. At its top, the bearing assembly 430 includes a jacking plate 432 that engages and supports the central hub 36. The jacking plate 432 is sufficiently strong to hold and support the entire rotor 34 and, thus, a bearing 436 included in the bearing assembly 430 can be serviced without dismantling the entire rotary adsorption machine 26. That is, during maintenance, the jacking plate 432 can be engaged to lift the rotor 34 off the bearing assembly 430 and allow a user to access and service (or replace) the bearing assembly 430 or portions thereof. The jacking plate 432 has been designed through finite element analysis and can support rotor weights up to 1700 metric tons.

Beneath the jacking plate 432, a top cover 433 cooperates with a housing 431 to form an enclosure for the bearing 436 in which an oil bath 434 can lubricate bearing 436. In at least some embodiments, the housing 431 may be stationary while the top cover 433 rotates with the central hub 36 and an upper bearing race of the bearing 436 to facilitate rotation of the rotor 34 (and potentially with the jacking plate 432 too). At the same time, the top cover 433 may support a seal that prevents dirt and debris from entering the oil bath 434. On the other side, the housing 431 sits atop a support stool 438, with a bearing shim 437 disposed therebetween. The housing 431 also defines a sump so that oil in the oil bath 434 is gravitationally drawn towards an oil mechanism 435.

In the depicted embodiment, the oil mechanism 435 includes an oil filler 4351, an oil level gauge 4352, an oil drain 4353, and an oil temperature probe 4354. One or more of these components may be connected (via a wired or wireless connection) to a graphical user interface (GUI) to provide maintenance feedback. Additionally or alternatively, one or more of these components may be connected to a processor configured to analyze data and produce alerts and/or notifications (e.g., based on temperatures, oil level). Thus, an operator can service the oil, e.g., via oil filler 4351 and/or oil drain 4353 in response to feedback from the oil mechanism 435 (whether from a manual reading, a pushed notification, data displayed on a GUI, etc.), or for any other reason (e.g., regular, scheduled maintenance).

Figure 13:
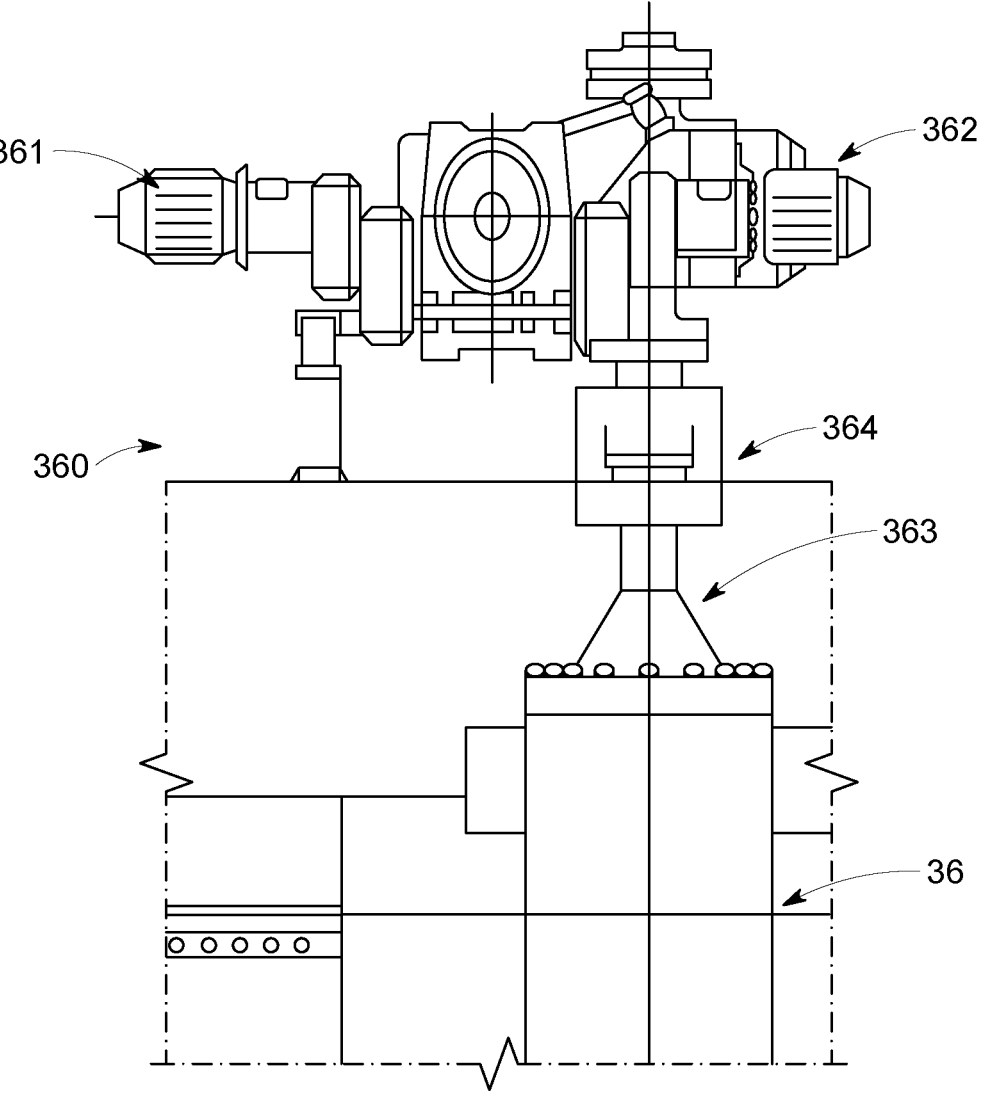
FIG. 13 is a side view of a first embodiment of a drive unit that may be included or incorporated in the RAM of FIG. 2, according to an example embodiment.
Figure 14:
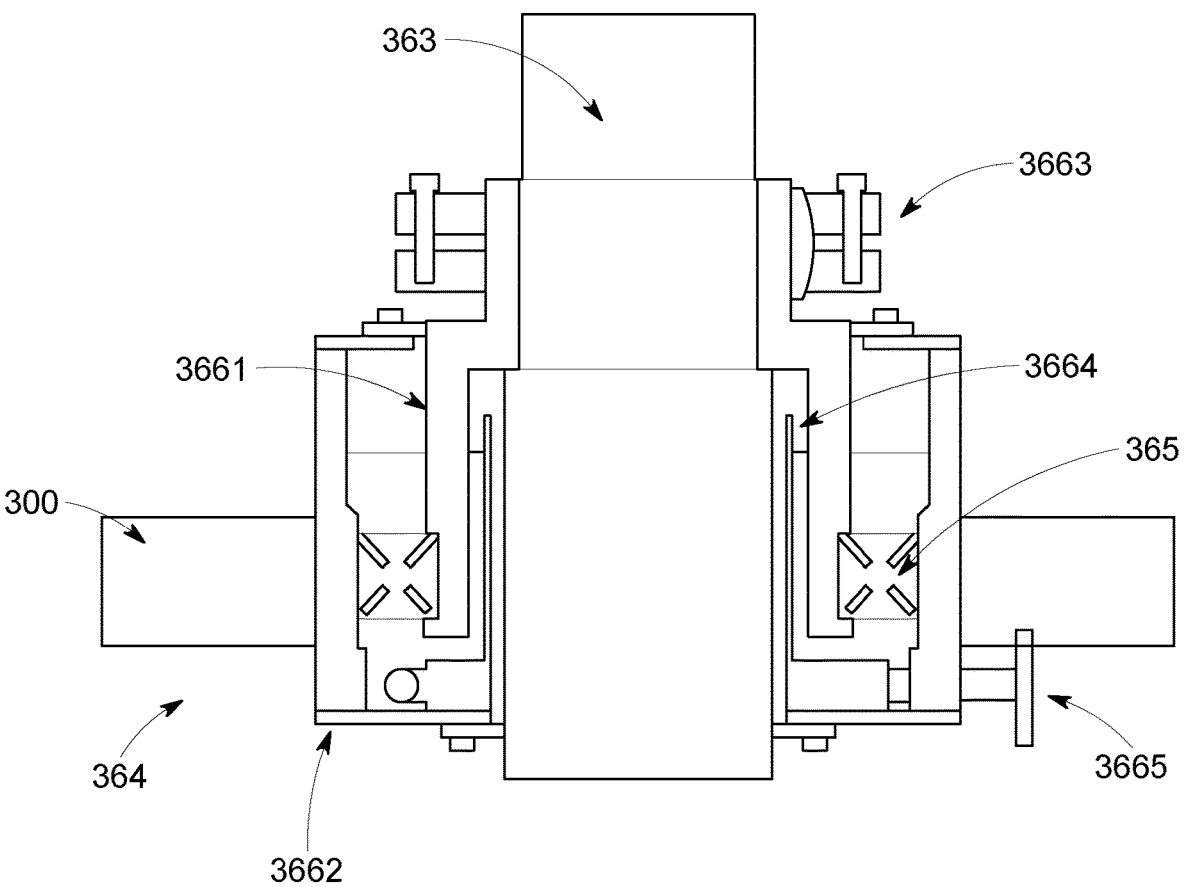
FIG. 14 is a sectional view of a bearing assembly included in the drive unit of FIG. 13.
Figure 15:
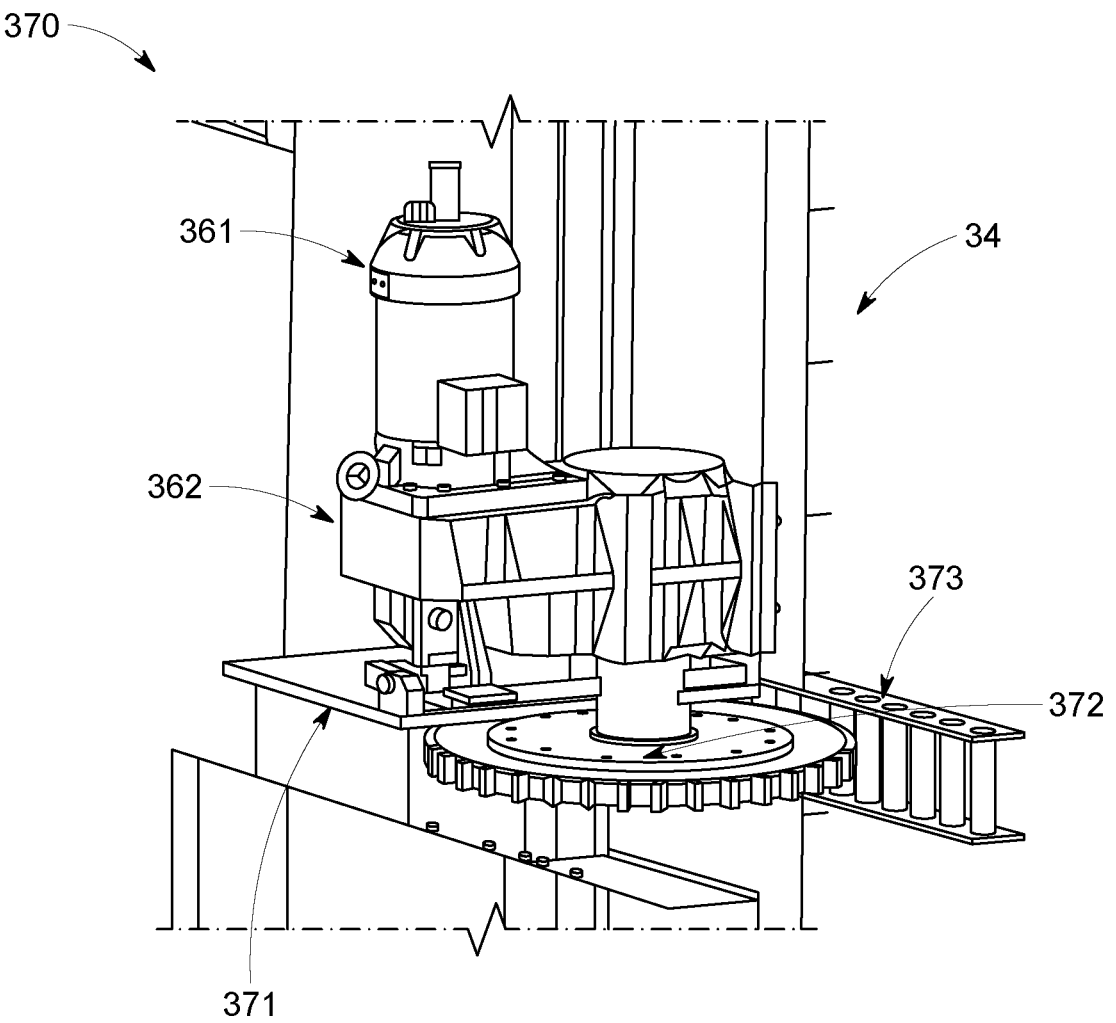
FIG. 15 is a perspective view of a second embodiment of a drive unit that may be included or incorporated in the RAM of FIG. 2, according to an example embodiment.

Now turning to FIGS. 13-15, these Figures depict at least two embodiments of drive units that can be included or incorporated into housing 100. In some instances, these drive units structurally enforce the rotary adsorption machine 26 and, thus, for the purposes of the present application, the drive units may be considered another type of structural reinforcement, whether provided in lieu of or in combination stiffeners 200, bottom frame assembly 400, and/or bottom frame assembly 401 (or any other feature described hereafter). FIGS. 13 and 14 provide side and schematic, sectional views of a first embodiment a first drive unit 360. FIG. 15 provides a side perspective view of a second embodiment of a second drive unit 370.

The first drive unit 360 and the second drive unit 370 are each described in turn below; however, generally, both the first drive unit 360 and the second drive unit 370 are central drive units. The inventors have found central drive units to be reliable for large, industrial rotary adsorption machines at least because central drive units are easily accessible for maintenance. Central drive units have also been found reliable for driving rotation of a large rotor at low rotational speeds.

As can be seen in FIGS. 13 and 14, the first drive unit 360 includes a motor 361 that is configured to drive rotation of the rotor 34 by driving rotation of the central hub 36. The motor 361 is connected to the central hub 36 via a gearbox 362 and a shaft 363 that extends through a top bearing assembly 364 (e.g., a "stub shaft"). As can be seen in FIG. 14, the top bearing assembly 364 generally supports a bearing 365 between the shaft 363 and the top frame assembly 300. However, importantly, the top bearing assembly 364 is specifically designed to allow the bearing 365 to be accessible without removing the shaft 363. This simplifies maintenance operations which, in turn, may extend the life of the top bearing assembly 364.

More specifically, the top bearing assembly 364 includes a mounting bell 3661 that is configured to support the bearing 365. The mounting bell 3661 is designed so that the bearing 365 need not be clamped to the shaft 363. Instead, the bearing 365 can be fitted to the mounting bell 3661 and secured in place with a retaining ring 3662. Then, when the mounting bell 3661 and retaining ring 3662 are moved into place along the shaft 363, the mounting bell 3661 can be secured to the shaft 363 with a shrink disc coupling 3663. The mounting bell 3661 may also be precisely designed to withstand fluctuating forces due to pressure differentials between the streams (and be sized differently for different anticipated pressures).

As can be seen in FIG. 14, the top bearing assembly 364 is also designed to support an oil bath in which the bearing 365 can be submerged and, critically, this oil bath can be provided without using a seal. To achieve this, the top bearing assembly 364 includes an oil wall 3664 configured to axially extend internally of the mounting bell 3661. With this arrangement, the oil bath is gravitationally retained in the top bearing assembly 364 without using a seal on the shaft 363, which may be prone to wearing out and require frequent maintenance. In the depicted embodiment, the top bearing assembly 364 also includes a cooling coil 3665 configured to cool the oil bath. However, other embodiments may cool the oil bath in any manner, e.g., using water, a cooling jacket, etc.

FIG. 15 depicts a second drive unit 370 that may operate as a central drive unit. Like the first drive unit 360, the second drive unit 370 includes a motor 361 and gearbox 362. However, now, the motor 361 and gearbox 362 drive rotation of the rotor 34 via a geared arrangement. Specifically, the motor 361 and gearbox 362 are mounted on a plate 371 and configured to drive rotation of a gear/pinion 372. The pinion 372 engages a rack 373 disposed on the rotor 34 to drive rotation of the rotor 34 around its central hub 36. In such arrangements, an additional seal (not shown) may be required to minimize axial leakage.

Figure 16:
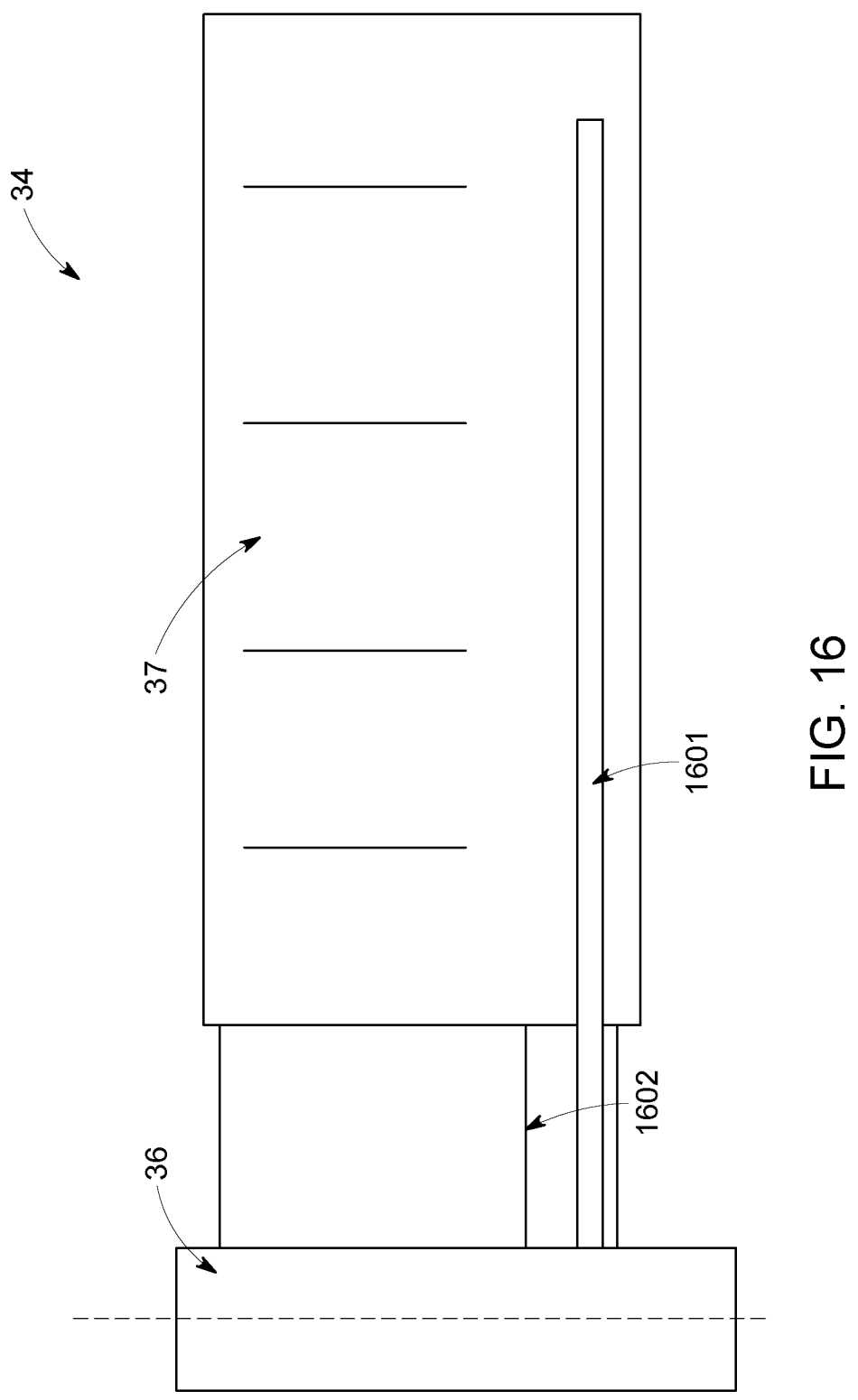
FIG. 16 is a schematic view of a portion of a rotor that may be included or incorporated in the RAM of FIG. 2, according to an example embodiment.

FIG. 16 depicts a side view of a radial plate 37 of a rotor 34 to depict yet another structural reinforcement that may be included in the rotary adsorption machine 26 presented herein. Again, this structural reinforcement may be provided in lieu of or in combination with any other structural reinforcement presented herein. Generally, a rotor 34 with a large mass and/or diameter, such as those necessary for the large, industrial rotary adsorption machine 26 presented herein, will need to be designed for stress, fatigue and buckling. In fact, adsorbents are often relatively light (e.g., at least as compared to heat transfer elements) and, thus, a rotor 34 a large diameter may minimize pressure drop, but be prone to buckling.

To combat this inclination to buckle, the rotary adsorption machine 26 presented herein may include a rotor 34 with an anti-buckling design. The anti-buckling design may comprise closing plates 1602 that are welded to the radial plates 37 at a right angle and an anti-buckling bar 1601 that extends along the radial plates 37 and the closing plates 1602, to the central hub 36. As an example, the anti-buckling bar 1601 may comprise a thick bar welded to the radial plate 37 and the dimensions of the anti-buckling bar 1601 may be determined through finite element analyses to support a rotor 34 with a diameter as large as 24 meters.

Now turning generally to FIGS. 17-23, the housing 100 of the rotary adsorption machine 26 presented herein also includes thermal expansion elements that allow the two or more sector plate assemblies to create seals between the plurality of zones. FIGS. 17-23 depict a variety of different features that comprise the thermal expansion elements and each of these elements are addressed in turn below. But, to be clear, these elements are not independent and are combinable in any desirable manner, both with other thermal elements and structural reinforcements presented herein.

Figure 17:
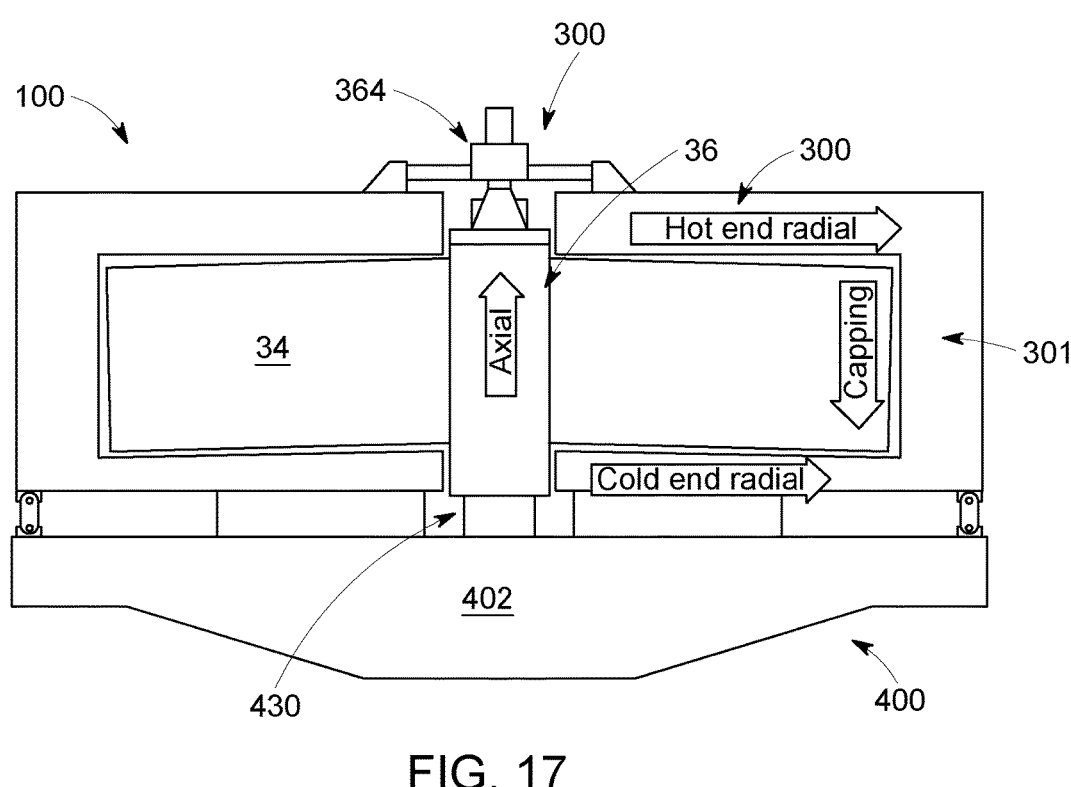
FIG. 17 is a schematic illustration of thermal effects that may impact the RAM presented herein.

First, FIG. 17 depicts a side, schematic view of the rotor 34 rotating through the housing 100. As mentioned, during rotation of rotor 34, radial plates 37 of rotor 34 rotate through one or more sector assemblies that delineate different sectors or zones within housing 100. During this rotation, opposite ends of the rotor (e.g., a top and bottom of rotor 34) are subjected to opposite temperature extremes. This subjects the rotor 34 to differential expansion that causes parabolic deformation towards cold temperatures, often referred to as "rotor turndown" (e.g., towards the bottom of the heat exchanger). Deformation of the rotor 34, particularly at the outermost ends, creates large running gaps between a top of the rotor 34 and a top sector plate 350 (see, e.g., FIG. 9) disposed at a bottom of the top frame assembly 300 (e.g., hot end radial leakage). These running gaps may allow for significant leakage between the various zones of the rotary adsorption machine 26 (e.g., the adsorption zone Z1, the desorption zone Z2, and the regeneration zone Z3), which may be referred to as radial seal leakage.

Additionally or alternatively, rotor deformation may allow for radial seal leakage (e.g., cold end radial leakage) between the rotor 34 and a bottom sector plate 450 (see, e.g., FIG. 9) supported by frame assembly 400. Still further, rotor deformation may lead to axial seal leakage between the rotor 34 and the sides of a sector assembly (e.g., proximate peripheral section 108), circular seal leakage between the shell 35 of the rotor 34 and the peripheral section 108 of the housing 28, and/or entrained leakage of the rotor 34. Thus, any features or elements that allow thermal expansion that allow the two or more sector plate assemblies to create seals between the plurality of zones (e.g., zones Z1, Z2, and Z3) are highly desirable.

Figures 18A, 18B:
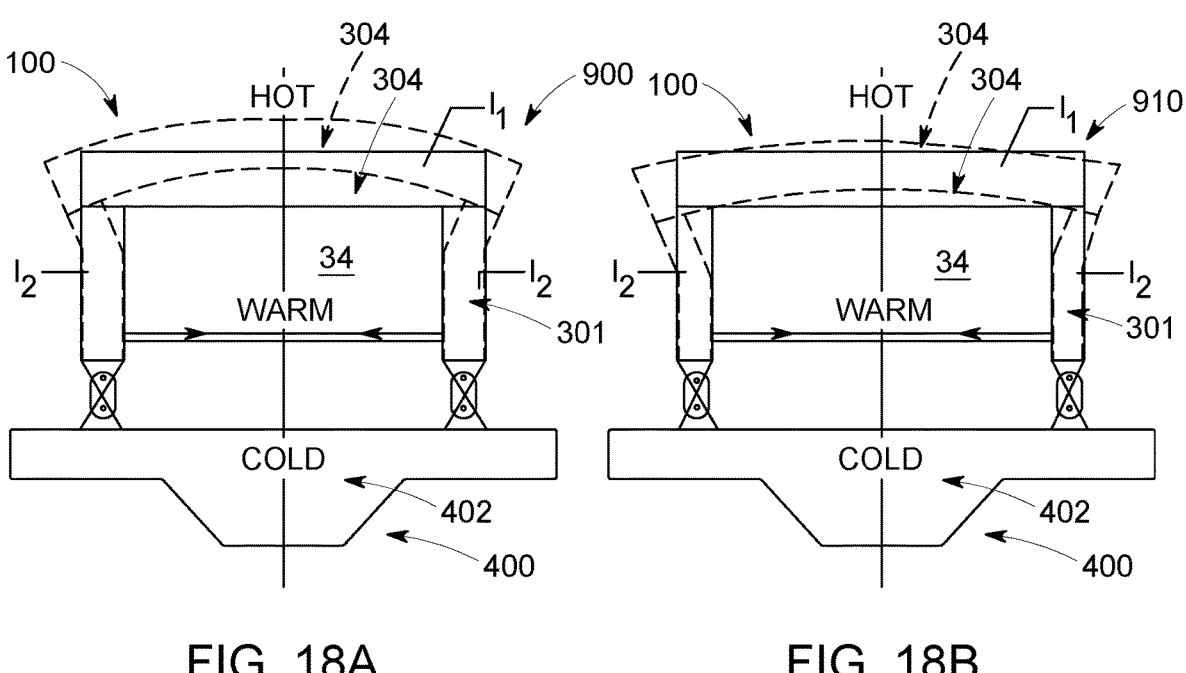
FIGS. 18A and 18B schematically illustrate exaggerated thermal expansion that may be carried out by the RAM presented herein, according to an example embodiment.

Now turning to FIGS. 18A and 18B, which depicted exaggerated, schematic views of the housing 100 presented herein, in at least some embodiments, the pillars 301 and the top frame assembly 300 may be or include thermal elements that allow for thermal expansion. FIG. 18A depicts thermal expansion 900 in response to a first temperature difference between the top frame assembly 300 and the bottom frame assembly 400. FIG. 18B depicts thermal expansion 910 in response to a second temperature difference, larger than the first temperature difference, between the top frame assembly 300 and the bottom frame assembly 400. As can be seen in FIG. 18A, when the temperature $I_1$ of the top assembly 300 is higher than a temperature $I_2$ of the bottom frame assembly 400, a bottom plate 304 of the top frame assembly 300 may flex on pillars 301 to match a rotor turndown of the rotor 34. Then, as can be seen in FIG. 18B, when the temperature difference between temperature $I_1$ and temperature $I_2$ increases further the bottom plate 304 of the top frame assembly 300 may flex further on pillars 301 to continue matching turndown of the rotor 34.

In some embodiments, this flexing may be possible due to the construction and/or materials of the top frame assembly 300 and/or the pillars 301. Additionally or alternatively, the pillars 301 may be movably coupled to the bottom frame assembly 400 in a manner that allows such flexing. In any case, the gaps between the rotor 34 and the housing 100 can, in at least some instances, be calculated and predicted, allowing sector plates and axial seal plates to be configured in a manner that seals each zones while prevents clashes between the rotor 34 and housing 100 during operation. Additionally, the housing 100, including ductwork thereof, can be insulated to prevent heat loss to atmosphere while maintaining even thermal expansion.

Figure 19:
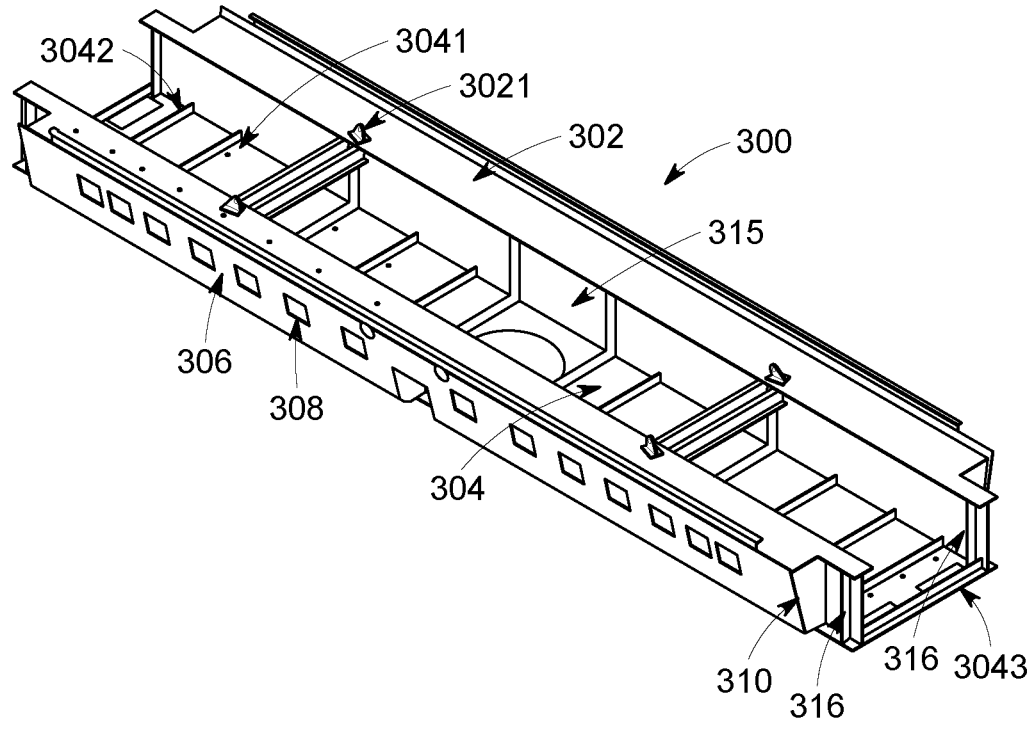
FIG. 19 is a top perspective view of a top frame assembly that may be included or incorporated in the RAM of FIG. 2, according to an example embodiment.
Figure 20:
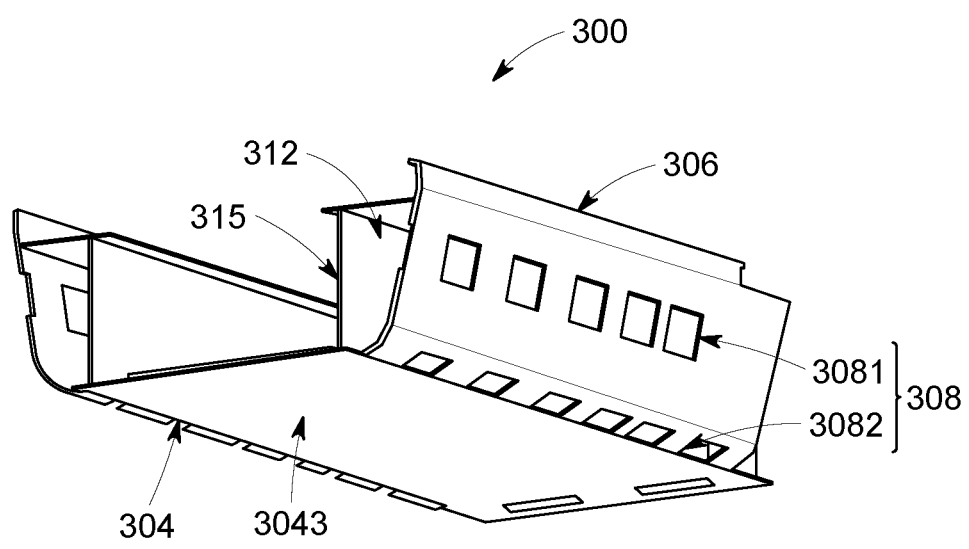
FIG. 20 is a bottom perspective view of a portion of the top frame assembly of FIG. 19.
Figure 21:
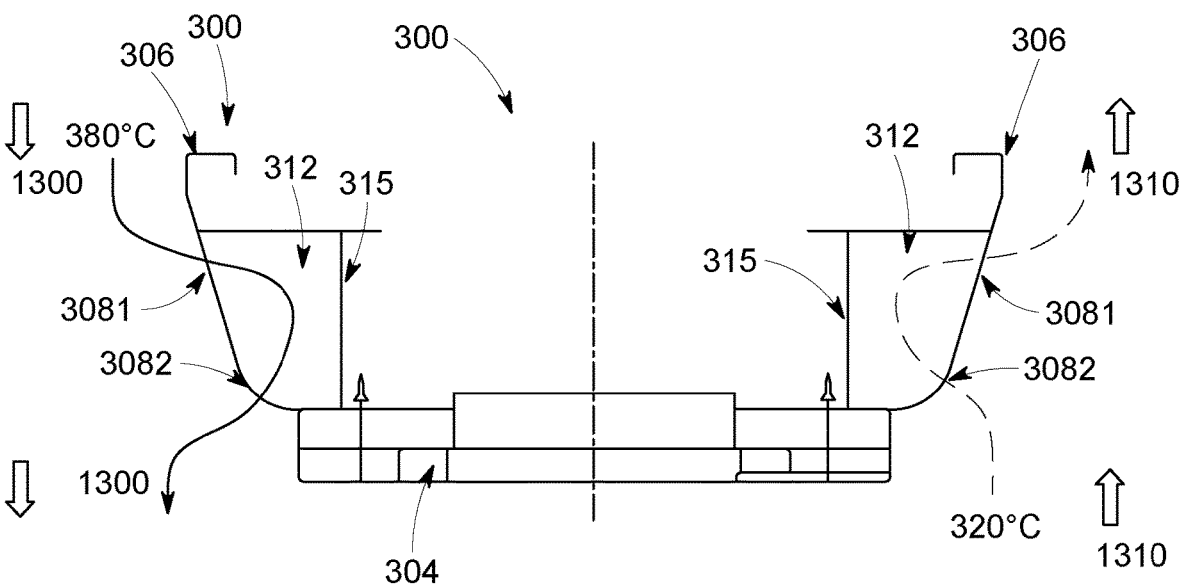
FIG. 21 is a schematic illustration of the top frame assembly of FIG. 19 depicting heat transfer through the top frame assembly according to an example embodiment.

Now turning to FIGS. 19-21, in at least some embodiments, the thermal expansion may be carefully managed by designing the top frame assembly 300 to include thermal elements that allow gases to flow through the top frame assembly 300. More specifically, in the depicted embodiment, the top frame assembly 300 may be a generally U-shaped assembly and include top beams 302 that are connected to a bottom plate 304 by web plates 315 at opposite sides of the bottom plate 304. As is shown in FIG. 19, this U-shape may be include various stiffeners to ensure it is structurally sounds. Specifically, lateral stiffeners 3042 can extend across a top surface 3041 of the bottom plate 304. Lifting points 3021 can also act as stiffeners and can include structures extending across both the top surface 3041 of the bottom plate 304 and internal surfaces of the web plates 315. Additionally, longitudinal stiffeners 316 may extend between the top surface 3041 and a bottom side of the top beam 302. The combination of these stiffeners may stabilize the bottom plate 304 while still allowing the bottom plate 304 to thermally expand in the manner described in connection with FIGS. 18A and 18B. This may be particularly important since a bottom surface 3043 of the bottom plate 304 may support a top sector plate, such as top sector plate 350 (see, e.g., FIG. 9)

The top beams 302 also extend over the web plates 315 to support a wing plate 306 that extends around the web plates 315, at least partially enclosing channels channel 312 (see FIG. 20) between the wing plate 306 and the web plates 315. The ends of channels 312 may each be capped by a closing plate 310 to laterally close channels 312. Thus, ingress and egress to the channels 312 may be controlled by slots 308 included in wing plates 306. More specifically, wing plate 306 may include a first row of slots 3082 and a second row of slots 3081 longitudinally offset (e.g., above) the first row of slots 3082. As can be seen in FIG. 21, this allows hot gases 1300 and 1310 to flow through the top frame assembly 300. In particular, first gas flow 1300 enters the channels 312 via the second row of slots 3081 and exiting the channels 312 via the first row of slots 3082. Meanwhile, second gas flow 1310 enters the channels 312 via the first row of slots 3082 and exiting the channels 312 via the second row of slots 3081. Thus, gas flow 1300 flows into the housing 100 while gas flow 1310 flows out of the housing 100. In at least some instances, gases 1300 are relatively hotter than gases 1310, such as 380° C. and 320° C., respectively.

When hot gas flows through the top frame assembly 300 like this, the top frame assembly 300 will experience increased heat transfer (e.g., as compared to only having external exposure), causing the top frame assembly 300 to expand (or contact) more rapidly. This helps to ensure that the top frame assembly 300 (and the bottom plate 304 in particular) thermally deforms in a manner that matches a deformation of the rotor 34 during a rapid rate of temperature change. In turn, this will prevent a sector plate 350 mounted to the bottom plate 304 from clashing with the top frame assembly 300 (e.g., undesirably contacting the top frame assembly 300) while also ensuring that the top sector plate 350 minimizes a gap between the rotor 34 and the housing 100. That is, thermal deformation of the housing 100 allows the housing 100 to accommodate and seal against the rotor 34 as the rotor 34 thermally expands and/or contracts. Without slots 308, the rotor 34 would expand (or contract) quicker than relatively static the top frame assembly 300.

Figure 22:
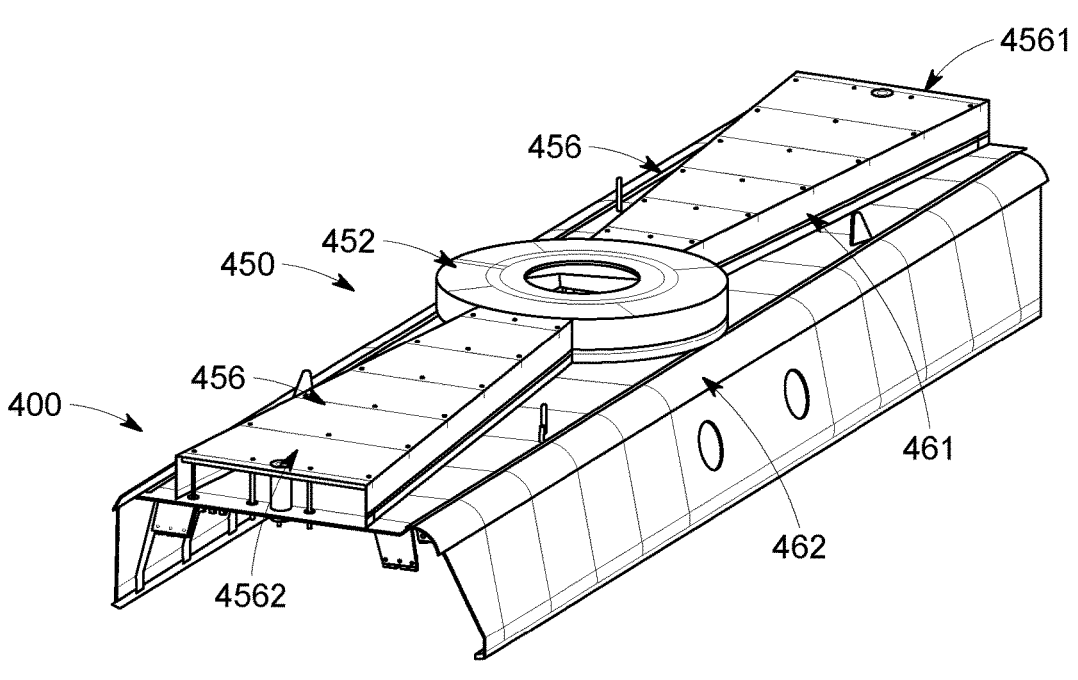
FIG. 22 is a top perspective view of a portion of a bottom frame assembly that may be included or incorporated in the RAM of FIG. 2, according to an example embodiment.
Figure 23:
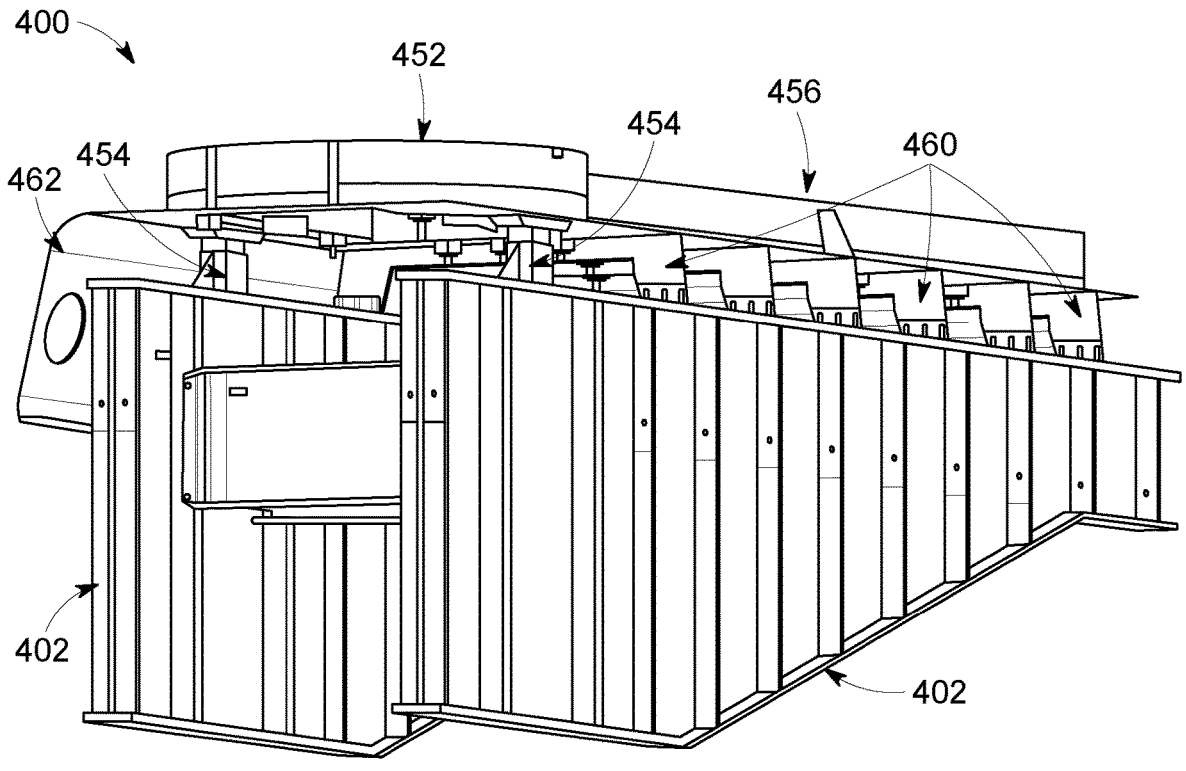
FIG. 23 is a bottom view of the bottom frame assembly of FIG. 22.

Next, FIGS. 22 and 23 depict additional thermal elements that may be included in the bottom frame assembly 400. FIG. 22 is a top view of a portion of the bottom frame assembly 400 that includes the bottom sector plate 450. FIG. 23 is a side view of a portion of the bottom frame assembly 400 that schematically depicts a sectional view of this portion. Notably, in FIG. 23, the bottom frame assembly 400 is depicted as including tapered girders 402; however, to be clear, this is merely an example and the thermal elements depicted in FIGS. 22 and 23 could be included in any desirable embodiment of bottom frame assembly 400.

That said, in the depicted embodiment, the bottom sector plate 450 includes a hub 452 and extensions 456 that extend away from the hub 452 in opposite directions, to ends 4561 and 4562. Additionally, the entire bottom sector plate 450 includes a bottom plate 461 that sits atop a U-shaped plate 462 that supports a bottom of the bottom sector plate 450 and extends longitudinally away from bottom plate 461. During operation of the rotary adsorption machine 26, there may be a temperature difference between the bottom sector plate 450 and the bottom frame assembly 400 supporting the bottom sector plate 450 (e.g., between the bottom sector plate 450 and the girders 402). This is because the bottom sector plate 450 may be heated by fluids in the rotor 34 while the bottom frame assembly 400 may not and may remain colder. To combat this, the hub 452 of the bottom sector plate 450 may be fixedly coupled to the girders 402 via fixed connectors 454 (and via plate 462) while the extensions 456 are movably coupled to the girders 402 via flexible connections flexible connectors 460 (and, again, via plate 462). The flexible connectors 460 would allow the extensions 456 to expand longitudinally in response to temperature gradients.

Overall, the RAM and RAM housing provided herein achieve at least the advantages described herein. However, to be clear, while the application utilizes specific embodiments to describe the RAM and the RAM housing, as well as the advantages thereof, it is not intended to be limited to the details shown. Instead, it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the sector plate described herein, or portions thereof may be fabricated from any suitable material or combination of materials, such as metals or synthetic materials including, but not limited to, plastic, rubber, derivatives thereof, and combinations thereof. It is also intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. A housing for a rotary adsorption machine comprising:
   a peripheral section configured to circumferentially surround a rotor and define a plurality of zones through which the rotor can rotate, including an adsorption zone, a desorption zone, and a regeneration zone;
   two or more sector plate assemblies that define the plurality of zones;
   a plurality of ducts that define passageways into and out of the plurality of zones, wherein the peripheral section connects an inlet of each duct of the plurality of ducts to an outlet of each duct of the plurality of ducts,
   structural reinforcements that support the rotor, balance internal pressures in the housing, and/or dampen or eliminate tilting or deflections in the housing; and
   thermal expansion elements that allow the two or more sector plate assemblies to create seals between the plurality of zones.

2. The housing for a rotary adsorption machine of claim 1, wherein the structural reinforcements comprise a plurality of duct stiffeners that extends across the plurality of ducts to reinforce the plurality of ducts and dampen or eliminate tilting or deflections in the plurality of ducts.

3. The housing for a rotary adsorption machine of claim 2, wherein duct stiffeners for a particular duct of the plurality of ducts extend from an outer flange of the particular duct to a lateral flange of the particular duct, spanning a corner of the particular duct.

4. The housing for a rotary adsorption machine of claim 1, wherein the structural reinforcements comprise:
   a plurality of peripheral stiffeners coupled, at least at one end, to the peripheral section of the housing to reinforce the peripheral section and dampen or eliminate deflections in peripheral section.

5. The housing for a rotary adsorption machine of claim 1, wherein the structural reinforcements comprise:
   a bottom frame assembly comprising at least one girder configured to support a bearing assembly that rotatably supports the rotor in the housing, the at least one girder being configured to distribute a load of the rotor.

6. The housing for a rotary adsorption machine of claim 5, wherein the bearing assembly comprises a jacking plate configured to lift and support the rotor to allow maintenance of the bearing assembly.

7. The housing for a rotary adsorption machine of claim 5, wherein the bearing assembly includes a bottom bearing cover and an upper bearing cover configured to define an oil bath therebetween, the upper bearing cover being rotatable with respect to the bottom bearing cover.

8. The housing for a rotary adsorption machine of claim 5, wherein the bottom frame assembly further comprises a center column positioned directly under the bearing assembly.

9. The housing for a rotary adsorption machine of claim 1, wherein the thermal expansion elements comprise pillars and a top plate of the housing, the pillars and top frame assembly being at least partially expandable to accommodate and seal against the rotor as the rotor thermally expands and/or contracts.

10. The housing for a rotary adsorption machine of claim 9, wherein the top frame assembly includes slots to allow heat to move through the top frame assembly, towards or away from the rotor.

11. The housing for a rotary adsorption machine of claim 10, wherein the slots include two rows of slots that provide inlets and outlets to a channel defined within the top frame assembly.

12. The housing for a rotary adsorption machine of claim 1, wherein the thermal expansion elements comprise a thermally expandable bottom sector plate included in a bottom frame assembly of the housing.

13. The housing for a rotary adsorption machine of claim 12, wherein a center of the thermally expandable bottom sector plate is fixedly coupled to a girder of the bottom frame assembly and extensions of the thermally expandable bottom sector plate are movably coupled to the girder.

14. A rotary adsorption machine comprising:
   a housing comprising:
      a peripheral section configured to circumferentially surround a rotor and define a plurality of zones through which the rotor can rotate, including an adsorption zone, a desorption zone, and a regeneration zone;
      two or more sector plate assemblies that define the plurality of zones;
      a plurality of ducts that define passageways into and out of the plurality of zones, wherein the peripheral section connects an inlet of each duct of the plurality of ducts to an outlet of each duct of the plurality of ducts,
      structural reinforcements that support the rotor, balance internal pressures in the housing, and/or dampen or eliminate tilting or deflections in the housing; and
      thermal expansion elements that allow the two or more sector plate assemblies to create seals between the plurality of zones; and
   the rotor disposed in the housing and configured to receive adsorptive materials and to rotate the adsorptive materials within the housing.

15. The rotary adsorption machine of claim 14, wherein the rotary adsorption machine is an industrial rotary adsorption machine with a rotor spanning at least 20 meters in diameter.

16. The rotary adsorption machine of claim 14, further comprising a drive unit positioned above the rotor, the drive unit comprising a bearing that is serviceable and/or removable from the drive unit without removing a shaft of the drive unit.

17. The rotary adsorption machine of claim 14, wherein the structural reinforcements comprise a plurality of duct stiffeners that extends across the plurality of ducts to reinforce the plurality of ducts and dampen or eliminate tilting or deflections in the plurality of ducts.

18. The rotary adsorption machine of claim 14, wherein the structural reinforcements comprise:

a bottom frame assembly comprising at least one girder configured to support a bearing assembly that rotatably supports the rotor in the housing, the at least one girder being configured to distribute a load of the rotor.

19. The rotary adsorption machine of claim 14, wherein the thermal expansion elements comprise pillars and a top plate of the housing, the pillars and top frame assembly being at least partially expandable to accommodate and seal against the rotor as the rotor thermally expands and/or contracts.

20. The rotary adsorption machine of claim 14, wherein the thermal expansion elements comprise a thermally expandable bottom sector plate included in a bottom frame assembly of the housing.

\* \* \* \* \*